US012572029B2

(12) United States Patent
Takahashi et al.

(10) Patent No.: US 12,572,029 B2
(45) Date of Patent: Mar. 10, 2026

(54) AIR FLOATING VIDEO DISPLAY APPARATUS

(71) Applicant: MAXELL, LTD., Kyoto (JP)

(72) Inventors: Hiroaki Takahashi, Kyoto (JP); Koji Hirata, Kyoto (JP); Koji Fujita, Kyoto (JP); Yasuyuki Ozawa, Aichi (JP); Takahito Kawasaki, Aichi (JP); Mutsuki Ukai, Aichi (JP)

(73) Assignee: MAXELL, LTD., Kyoto (JP)

( * ) Notice: Subject to any disclaimer, the term of this patent is extended or adjusted under 35 U.S.C. 154(b) by 58 days.

(21) Appl. No.: 18/292,455

(22) PCT Filed: Jul. 6, 2022

(86) PCT No.: PCT/JP2022/026866
§ 371 (c)(1),
(2) Date: Jan. 26, 2024

(87) PCT Pub. No.: WO2023/008125
PCT Pub. Date: Feb. 2, 2023

(65) Prior Publication Data
US 2025/0085563 A1 Mar. 13, 2025

(30) Foreign Application Priority Data
Jul. 29, 2021 (JP) ................................. 2021-124616

(51) Int. Cl.
*G02B 30/56* (2020.01)
*G02B 27/28* (2006.01)

(52) U.S. Cl.
CPC ........... *G02B 30/56* (2020.01); *G02B 27/283* (2013.01); *G02B 27/286* (2013.01)

(58) Field of Classification Search
CPC ..... G02B 30/56; G02B 27/283; G02B 27/286
See application file for complete search history.

(56) References Cited

U.S. PATENT DOCUMENTS 10,302,954 B2      5/2019  Houzyou et al.
2004/0145457 A1*   7/2004  Schofield ........... G02B 27/0101
                                                          340/425.5
(Continued)

FOREIGN PATENT DOCUMENTS

JP      2008-304783 A    12/2008
JP      2017-167224 A     9/2017
(Continued)

OTHER PUBLICATIONS

Japanese Office Action received in corresponding Japanese Application No. 2021-124616 dated Oct. 15, 2024.
(Continued)

*Primary Examiner* — Towfiq Elahi
(74) *Attorney, Agent, or Firm* — MATTINGLY & MALUR, PC

(57) ABSTRACT

A technique that is suitable for use in a vehicle and capable of displaying an air floating video with high visibility is provided. The present invention contributes to "Goal 3: Ensure healthy lives and promote well-being for all at all ages" and "Goal 9: Build resilient infrastructure, promote inclusive and sustainable industrialization and foster innovation" in the sustainable development goals. The air floating video display apparatus includes a housing 106 which is attachable at a position near a ceiling or a rearview mirror in the vehicle and stores a video display apparatus 1. A polarization separation member 101 and a retroreflector 2 on which a λ/4 plate 21 is provided, which are each arranged at a predetermined angle, are provided outside the housing 106. A video light of a specific polarized wave from the video display apparatus 1 is reflected by the polarization separation member 101, is retroreflected by the retroreflector 2, and passes through the λ/4 plate 21 to be subjected to polarization conversion, and the video light after the polarization conversion passes through the polarization separa- (Continued)

tion member 101 to display an air floating video 3 at a predetermined position.

8 Claims, 12 Drawing Sheets

(56) References Cited

U.S. PATENT DOCUMENTS

| | | | |
|---|---|---|---|
| 2015/0248014 A1* | 9/2015 | Powell | G02F 1/1334 |
| | | | 359/479 |
| 2017/0261759 A1 | 9/2017 | Yamamoto | |
| 2018/0031878 A1* | 2/2018 | Koito | G02B 5/124 |
| 2018/0284470 A1 | 10/2018 | Yamamoto et al. | |
| 2019/0227489 A1 | 7/2019 | Tukuchi | |

FOREIGN PATENT DOCUMENTS

| | | |
|---|---|---|
| JP | 2019-128722 A | 8/2019 |
| JP | 2021-047440 A | 3/2021 |
| WO | 2016/088683 A1 | 6/2016 |
| WO | 2016/199917 A1 | 11/2017 |
| WO | 2019/004202 A1 | 1/2019 |

OTHER PUBLICATIONS

International Search Report of PCT/JP2022/026866 dated Sep. 27, 2022.

* cited by examiner

( A )

( B )

VIDEO DISPLAY APPARATUS  1

VIDEO DISPLAY

1a

VIDEO CONTROLLER  1b

VIDEO SIGNAL RECEIVER
(WIRED)
(WIRELESS)  1c

1d

EXTERNAL PC ( A )

( B )

SURFACE ROUGHNESS OF RETROREFLECTION PLATE (nm)

*FIG. 7*

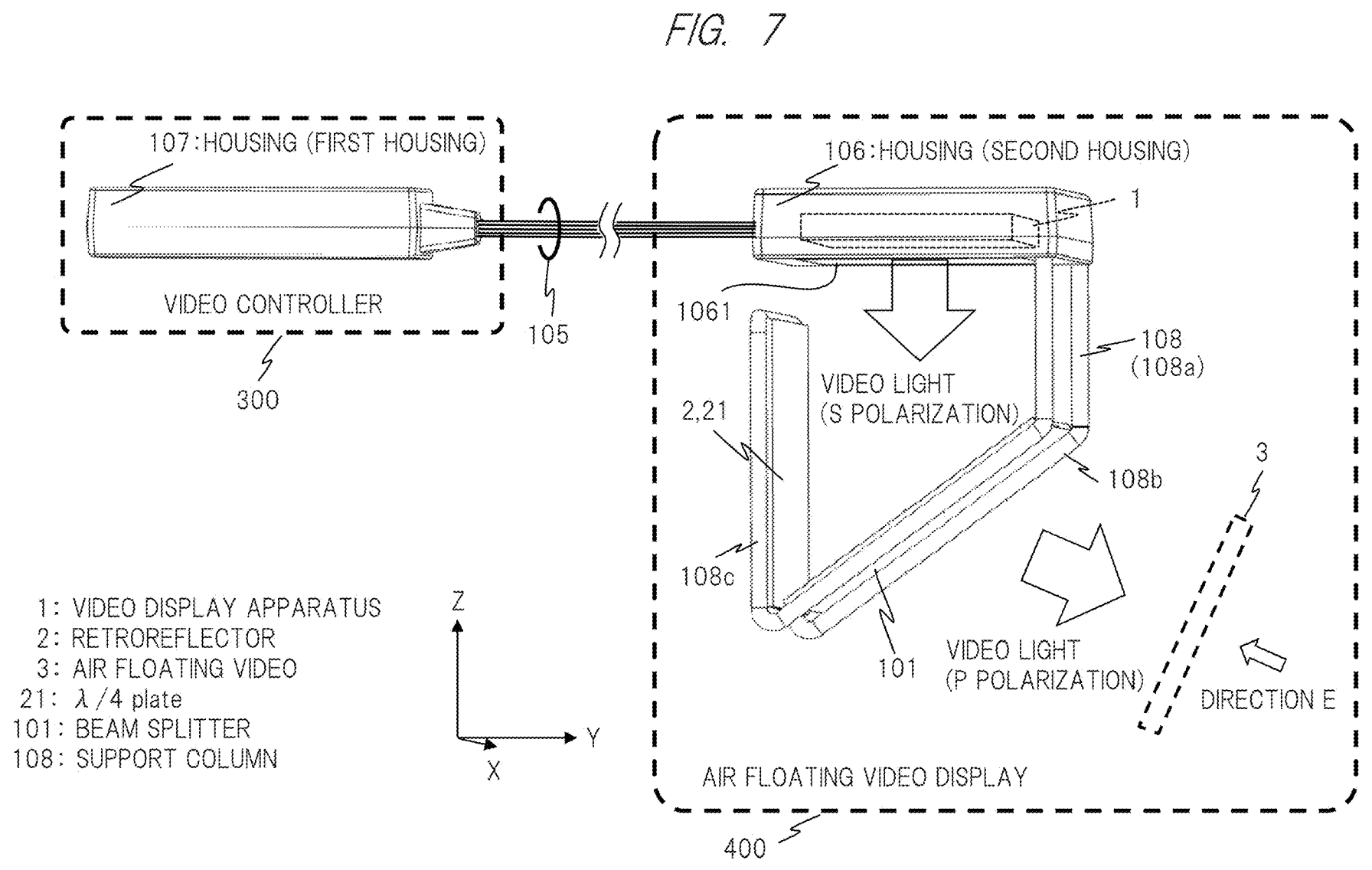

106:HOUSING (SECOND HOUSING)

1

108 (108a)

108b

1061

2,21

108c

101

VIDEO LIGHT (S POLARIZATION)

VIDEO LIGHT (P POLARIZATION)

3

DIRECTION E

AIR FLOATING VIDEO DISPLAY

400

105

107:HOUSING (FIRST HOUSING)

VIDEO CONTROLLER

300

Z

Y

X

1: VIDEO DISPLAY APPARATUS
2: RETROREFLECTOR
3: AIR FLOATING VIDEO
21: λ/4 plate
101: BEAM SPLITTER
108: SUPPORT COLUMN

AIR FLOATING VIDEO DISPLAY APPARATUS

TECHNICAL FIELD

The present invention relates to an air floating video display apparatus.

BACKGROUND ART

As an example of the air floating video display apparatus, Patent Document 1 discloses the description of "a CPU of an information processing apparatus includes an approaching direction detector configured to detect an approaching direction of a user to an image formed in the air, an input coordinate detector configured to detect coordinates where an input is detected, an operation receiver configured to process a reception of operation, and an operation screen updater configured to update an operation screen according to a received operation. The CPU receives a motion of the user as an operation when the user approaches the image from a predetermined direction, and performs the processing according to the operation" (excerpt of abstract).

RELATED ART DOCUMENTS

Patent Documents

Patent Document 1: Japanese Unexamined Patent Application Publication No. 2019-128722

SUMMARY OF THE INVENTION

Problems to be Solved by the Invention

Although the above-mentioned air floating video display apparatus of Patent Document 1 can improve the operability of the air floating video, it does not take into consideration the improvement of the visual resolution and contrast of the air floating video, and further improvement in video quality has been demanded under current circumstances.

The air floating video display apparatuses have a wide range of applications, and can achieve the effect of attracting the attention of a lot of people from the rarity of "floating video is displayed in the air" that is not possible in the conventional flat display if used as signage (advertising billboards). In addition, as described in Patent Document 1, if an air floating video is used as a human interface for performing some kind of operation, it is possible to achieve the effect of preventing virus infection via contact parts such as push buttons owing to its contactless feature.

On the other hand, if it is possible to readily install the air floating video display apparatus in vehicles such as automobiles, it is possible to give route guidance and point of interest (POI) information to a driver by, for example, video and voice of a human (hereinafter, concierge) displayed as an air floating video. Conversely, if the driver can instruct the concierge to set the temperature of the air conditioner, select music, and the like by means of voice or the like and the concierge can respond to the instructions by voice, it will be possible to provide safer, more comfortable, and visually stimulating driving assistance than that by the normal instruction using button operations. Voice utterance by the concierge or voice recognition and response to the driver's voice by the concierge can be realized using a known technique that has been already provided in a vehicle.

An object of the present invention is to provide an air floating video display apparatus particularly suitable for use in vehicles and capable of displaying an air floating video with high visibility.

Means for Solving the Problem

In order to solve the problem described above, for example, the configuration described in claims is adopted. Although this application includes a plurality of means for solving the problem, one example thereof can be presented as follows. That is, an air floating video display apparatus is an air floating video display apparatus configured to display an air floating video, and the air floating video display apparatus includes: a first housing configured to store a video controller; a second housing connected by wire or wirelessly to the first housing, attachable at a position near a ceiling or a rearview mirror in a vehicle, and configured to store a video display apparatus; a polarization separation member arranged outside the second housing obliquely at a predetermined angle with respect to the video display apparatus; and a retroreflector arranged outside the second housing obliquely at a predetermined angle with respect to the polarization separation member display apparatus and having a $\lambda/4$ plate provided on a retroreflection surface, the video display apparatus includes a light source apparatus and a liquid crystal display panel as a video source, and a video light of a specific polarized wave emitted from the liquid crystal display panel is reflected by the polarization separation member, enters the retroreflector to be retroreflected, and passes through the $\lambda/4$ plate to be subjected to polarization conversion into a video light of the other polarized wave, the video light of the other polarized wave passes through the polarization separation member, and an air floating video that is a real image is displayed at a predetermined position based on the transmitted video light.

Effects of the Invention

According to the present invention, it is possible to provide an air floating video display apparatus particularly suitable for use in vehicles, readily installed in vehicles, and capable of displaying an air floating video with high visibility. The problems, configurations, and effects other than those described above will be apparent from the following description of the embodiment.

BRIEF DESCRIPTION OF THE DRAWINGS

FIG. 7 is a layout diagram illustrating an external configuration of the air floating video display apparatus according to the example of the present invention.

DETAILED DESCRIPTION OF PREFERRED EMBODIMENTS

Figure 1:
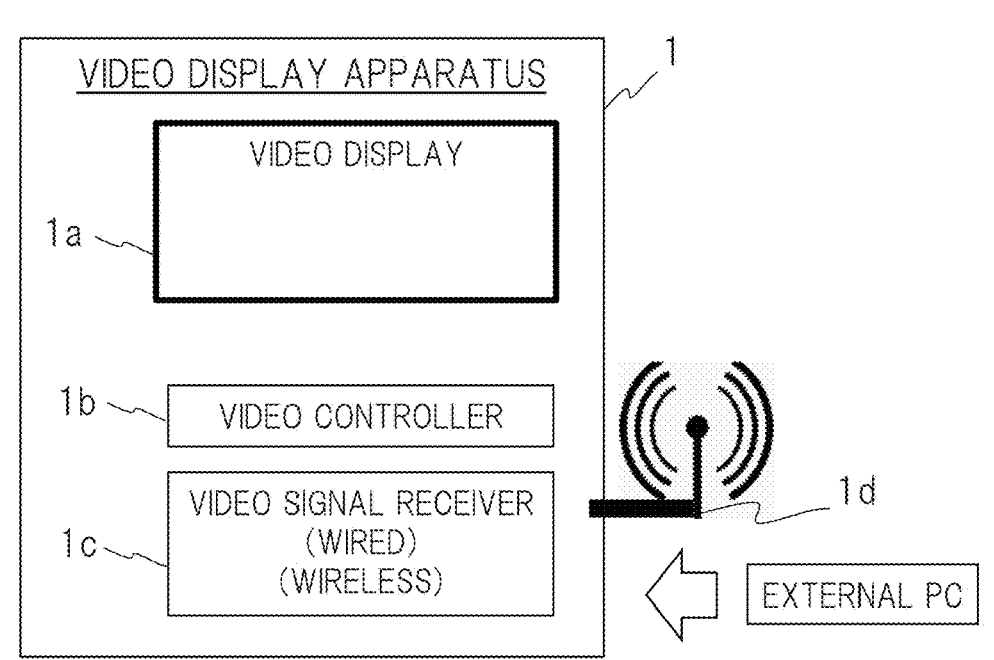
FIG. 1 is a diagram illustrating an example of a usage mode of an air floating video display apparatus according to an example of the present invention.

Hereinafter, an embodiment of the present invention will be described in detail with reference to the drawings. In the drawings, the same components are denoted by the same reference characters in principle, and repeated description thereof will be omitted. In the drawings, for easy understanding of the invention, each component does not represent an actual position, size, shape, range, and the like in some cases. In terms of description, in a case where processing by a program is described, the program, a function, a processor, and the like are mainly described in some cases, but the main body thereof as hardware is a processor or a controller, an apparatus, a computer, a system, or the like composed of the processor or the like. The computer executes processing in accordance with a program read on a memory by the processor, while appropriately using resources such as a memory or a communication interface. As a result, a predetermined function, a processing unit, and the like are implemented. The processor is composed of, for example, a semiconductor device such as a CPU or a GPU, or the like. The processor is composed of a device and a circuit that can perform predetermined calculation. The processing is not limited to software program processing and can be implemented by a dedicated circuit. As the dedicated circuit, an FPGA, an ASIC, a CPLD, or the like can be applied. The program may be installed in a target computer in advance as data or may be distributed and installed as data from a program source to the target computer. The program source may be a program distribution server on a communication network or may be a non-transitory computer-readable storage medium (memory card or the like) or the like. The program may be composed of a plurality of modules. A computer system may be composed of a plurality of apparatuses. The computer system may be composed of a client server system, a cloud computing system, or the like. Various types of data and information are composed of, for example, a structure of a table, a list, or the like, but are not limited thereto. Expressions such as identification information, an identifier, an ID, a name, and a number can be replaced with each other.

Embodiment

An air floating video display apparatus according to an embodiment includes a video display apparatus serving as a video source, and the video display apparatus includes a liquid crystal display panel serving as a video display element configured to emit a video light of a specific polarized wave (for example, S polarization) to form an air floating video, a light source apparatus configured to generate a backlight (in other words, light source light) for the liquid crystal display panel, a polarization separation member (in other words, beam splitter), and a retroreflector in which a retardation plate (in other words, λ/4 plate) is provided on a retroreflection surface. The S polarization (orthogonal polarization) means that a light is polarized in a direction orthogonal to an incident surface (here, S is an abbreviation for Senkrecht in German).

The video light of a specific polarized wave (for example, S polarization) emitted from the liquid crystal display panel based on the backlight from the light source apparatus in the video display apparatus first travels toward the beam splitter (in other words, polarization separation member). The beam splitter reflects the video light of a specific polarized wave from the liquid crystal display panel. The video light reflected by the beam splitter is directed toward the retroreflector. A retardation plate (λ/4 plate) is provided on a surface of the retroreflector serving as a retroreflection surface. The video light reflected by the beam splitter based on the video light of a specific polarized wave from the liquid crystal display panel is retroreflected on the surface of the retroreflector. The video light of a specific polarized wave is subjected to polarization conversion by passing through the retardation plate (λ/4 plate) twice in total at the time of entering the retroreflector and at the time of reflection from the retroreflector. Namely, the video light of a specific polarized wave is converted into the light of the other polarized wave (for example, P polarization). The P polarization (parallel polarization) means that a light is polarized in a direction parallel to an incident surface (here, P is an abbreviation for Parallel).

The video light of the other polarized wave after polarization conversion, which has been reflected by the retroreflector, travels toward the beam splitter. The beam splitter transmits the video light of the other polarized wave. The video light of the other polarized wave that has passed through the beam splitter forms and displays an air floating video that is a real image at a predetermined position on the opposite side of the retroreflector with the beam splitter interposed therebetween.

In order to improve a contrast performance of the air floating video, the video display apparatus according to the present embodiment may be provided with a polarization converter configured to align light source light from the light source apparatus with polarized light of a specific direction. For example, the light source apparatus includes a point-like or planar light source, an optical element that reduces a divergence angle of light from the light source, the polarization converter that aligns the light from the light source with polarized light of a specific direction, and a light guide body having a reflection surface that propagates the light from the light source to the liquid crystal display panel, and the light source apparatus controls a video light flux of the video light from the liquid crystal display panel based on a shape and a surface roughness of the reflection surface.

Although not limited, in consideration of use in the vehicle in particular, the air floating video display apparatus according to the embodiment includes an air floating video display that can be installed near a ceiling or a rearview mirror in a vehicle and a video controller provided separately from the air floating video display. The video controller is mounted and stored in a first housing. The video controller in the first housing includes a video signal processing circuit configured to generate a video signal and a control signal to be supplied to the video display apparatus in a second housing, a memory configured to accumulate video materials, a power supply circuit configured to convert a voltage supplied from a battery of the vehicle into a predetermined voltage, and the like. The first housing and the second housing are connected by wire or connected wirelessly. The first housing may be installed on a dashboard of the vehicle or may be installed in a place invisible to a driver or a passenger (for example, in glove compartment).

The air floating video display includes the video display apparatus, which is mounted and stored in the thin second housing, and the polarization separation member (beam splitter) and the retroreflector provided with a λ/4 plate as an optical system arranged outside the second housing. The video display apparatus configured to generate an air floating video with high visibility is incorporated in the second housing. The video light is emitted from the video display apparatus through an opening of the second housing toward the beam splitter on the lower side. The optical system arranged outside the second housing is arranged on the lower side of the second housing so as to be suspended via a support column without being covered with the housing.

The beam splitter is arranged on the lower side of the second housing so as to be inclined at a predetermined angle. The retroreflector is arranged behind the beam splitter. The video light reflected by the beam splitter travels slightly obliquely upward toward the retroreflector. The retroreflector is arranged such that the incident angle of the video light from the beam splitter is a predetermined angle within a range of approximately 0 degrees to 10 degrees. The video light reflected by the retroreflector travels slightly obliquely downward so as to return to the beam splitter. Then, the video light passes through the beam splitter as it is, travels slightly obliquely downward, and forms an air floating video at a position of a predetermined distance.

[Air Floating Video Display Apparatus]

The following example relates to, for example, an air floating video display apparatus capable of transmitting a video by video light from a large-area video light emitting source via a transparent member that partitions a space such as a glass of a show window and displaying the video as an air floating video inside or outside a space of a store. Furthermore, apart from the example above, the following other examples relate to an air floating video display apparatus capable of displaying a video by video light from a small-area (for example, about two to five inches) video light emitting source as an air floating video in a vehicle, by using an optical system composed of a beam splitter, a retroreflection plate, and the like to be described later.

Note that, in the following description of the examples below, a video floating in a space is expressed as a term "air floating video". Instead of this term, expressions such as an "aerial image", an "aerial floating video", an "air floating optical image of a display image", or an "aerial floating optical image of a display image" may be used. The term "air floating video" used in the description of the examples is used as a representative example of these terms.

According to the following examples, for example, high-resolution video information can be displayed on a glass surface of a show window or a light transmissive plate material in an air floating state. Furthermore, the air floating video display apparatus according to the examples can be installed even in a limited space such as the inside of the vehicle, and can present an air floating video to a person such as a driver without significantly reducing visibility due to external light reflection, unlike a conventional liquid crystal display panel or the like, even in a state in which strong light such as sunlight enters from the outside of the vehicle.

In the conventional air floating video display apparatus according to the related art, an organic EL panel or a liquid crystal display panel as a high-resolution color display video source is used in combination with a retroreflector. In the conventional air floating video display apparatus according to the related art, since video light is diffused at a wide angle, there have been following problems.

Figure 4:
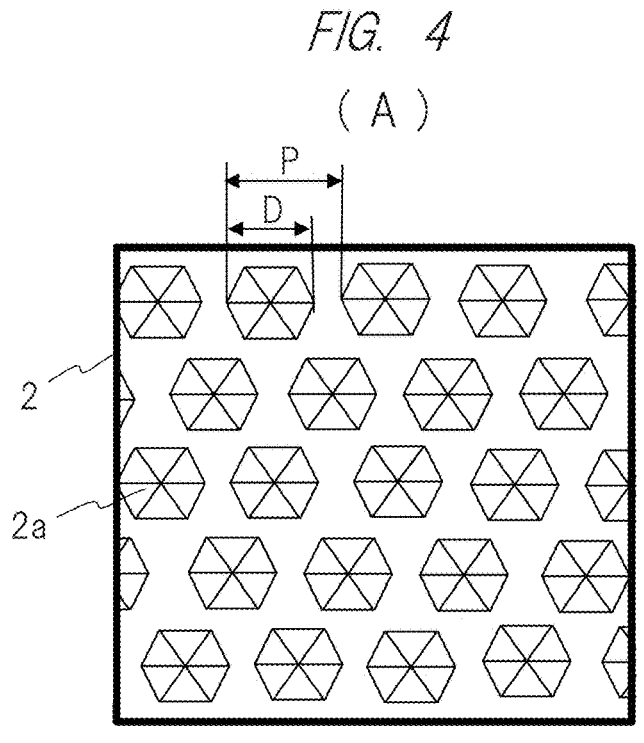
FIG. 4 is a diagram illustrating a detailed structure of a retroreflector.
Figure 4:
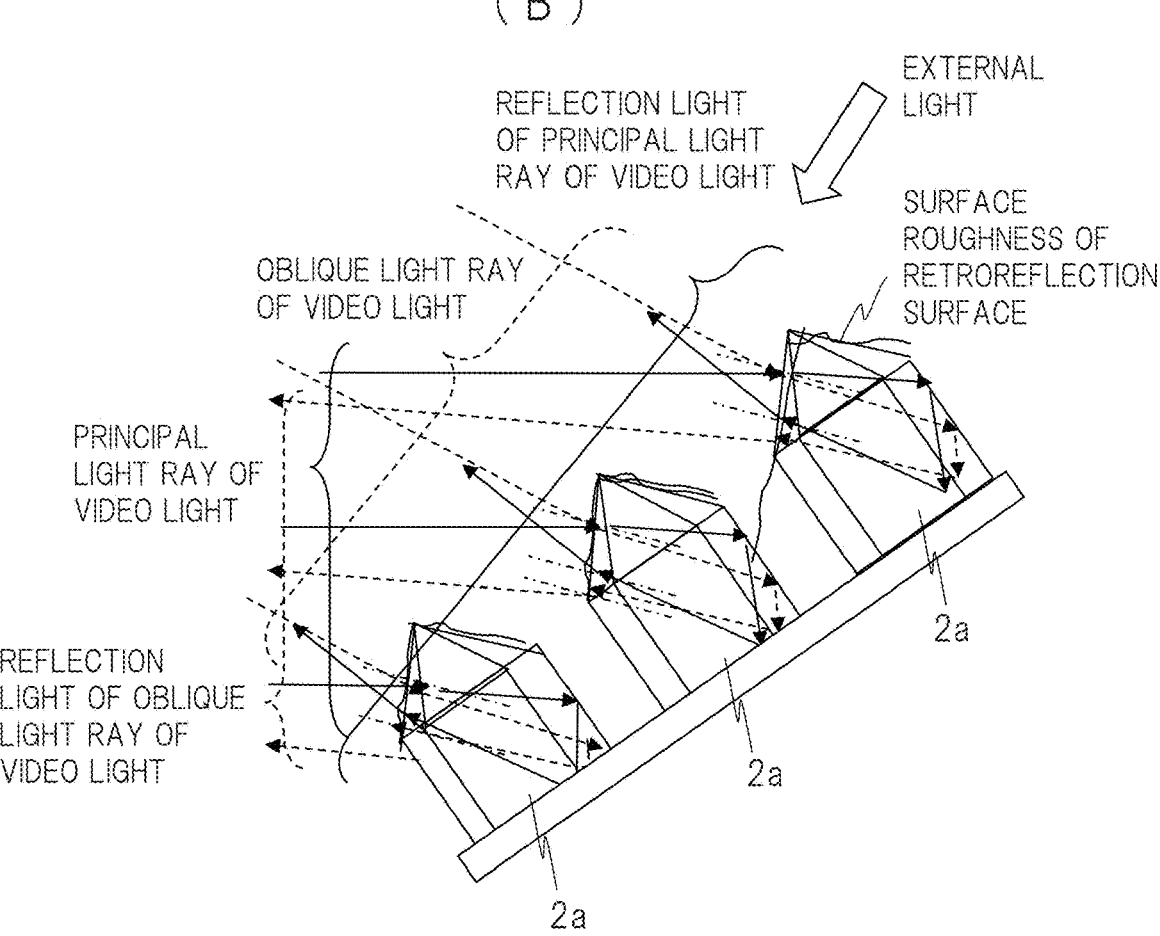

As illustrated in FIG. 4, a retroreflection portion 2a which is a retroreflection element is a hexahedron in a retroreflector 2 (referred to also as retroreflection plate or retroreflection sheet in some cases). Therefore, a ghost image is generated by the video light obliquely entering the retroreflector 2 in addition to a normal image formed by the reflection light reflected normally by the retroreflector 2, and this causes the problem of deteriorating the image quality of the air floating video.

Figure 5:
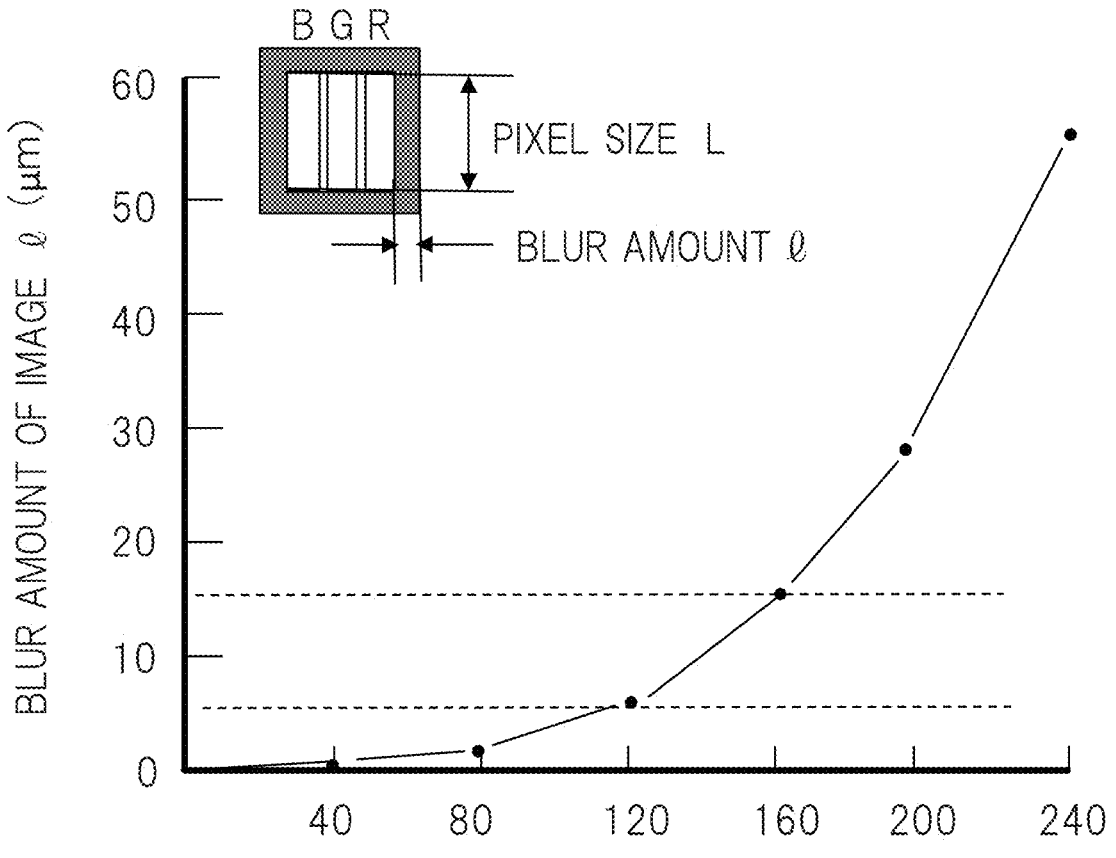
FIG. 5 is a characteristic diagram illustrating a relationship between a surface roughness of the retroreflector and a blur amount of a retroreflection image (air floating video).

Furthermore, as illustrated in FIG. 5, in an air floating video obtained by reflecting the video light from the video display apparatus as the video source by the retroreflector 2, there is also the problem of generating a blur for each pixel of the liquid crystal display panel in addition to the ghost image described above.

FIG. 1 illustrates an example of usage mode and a configuration example of an air floating video display apparatus according to one example of the present invention. FIG. 1(A) illustrates an overall configuration of the air floating video display apparatus according to the present example. For example, in a store or the like, a space is partitioned by a show window (window glass 105) which is a light transmissive member such as a glass (transparent member). The air floating video display apparatus according to the present example can display the air floating video to the outside of the space of the store in a single direction through such a transparent member.

Specifically, light of a specific polarized wave with narrow-angle directional characteristics is emitted as a video light flux from a video display apparatus 1, once enters the retroreflector 2, is retroreflected and passes through the window glass 105, thereby forming an air floating video 3 that is an aerial real image on the outside of the space of the store. In FIG. 1, the inner side of the window glass 105 (for example, inside of the store) is the far side and the outer side of the window glass 105 (for example, sidewalk) is the near side. On the other hand, an aerial image can be formed at a desired position in the store by providing a reflector configured to reflect a specific polarized wave on the window glass 105 and reflecting the video light flux by the reflector.

FIG. 1(B) is a block diagram illustrating a configuration example of the video display apparatus 1 described above. The video display apparatus 1 includes a video display 1a configured to display an original image of the aerial image, a video controller 1b configured to convert an input video in accordance with the resolution of a panel, a video signal receiver 1c configured to receive a video signal, and a receiving antenna 1d. The video signal receiver 1c is configured to handle signals input via a wired communication such as a universal serial bus (USB: registered trademark) input or a high-definition multimedia interface (HDMI: registered trademark) input and handle signals input via a wireless communication such as wireless fidelity (Wi-Fi: registered trademark), can function independently as a video receiver/display, and can also display video information from a tablet, a smartphone, and the like. Further, it is also possible to provide the capability of calculation processing, image analysis processing, and the like if a stick PC or the like is connected.

[Air Floating Video Display Apparatus (V Shape)]

Figure 2:
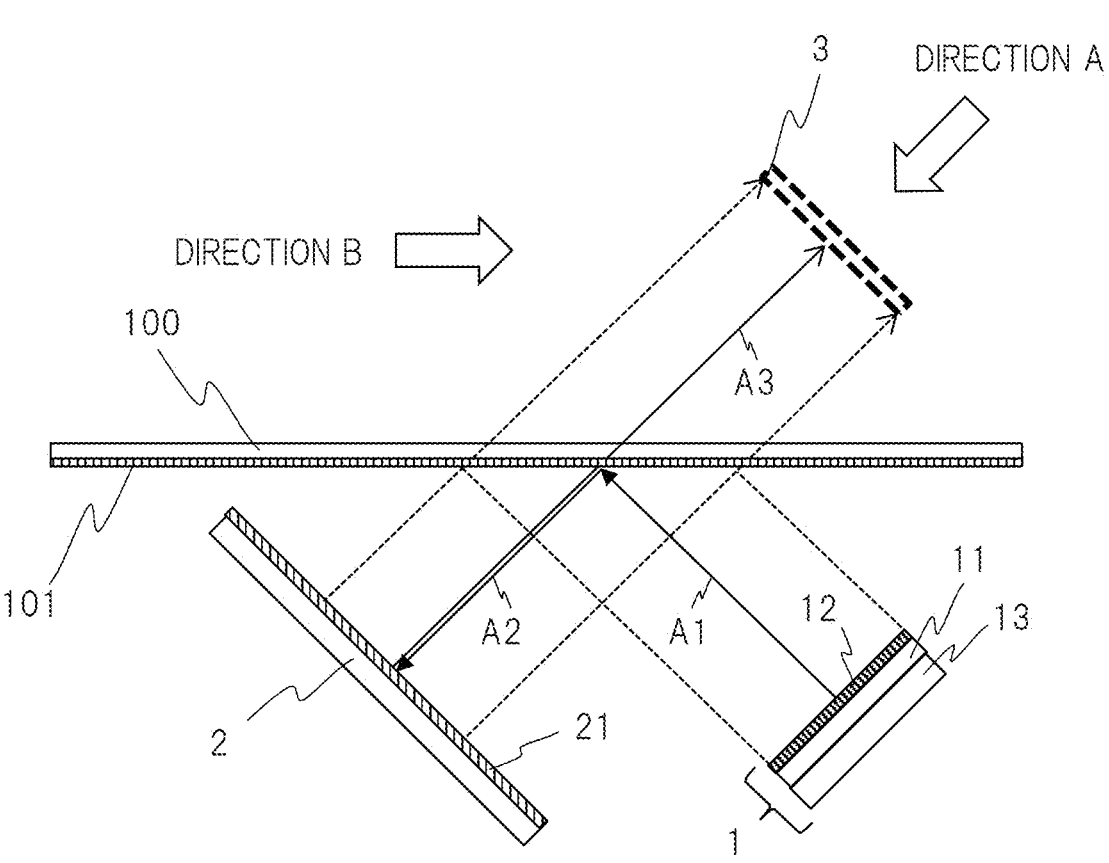
FIG. 2 is a diagram illustrating a V-shape configuration as an example of a main part configuration of the air floating video display apparatus according to the example of the present invention.

FIG. 2 illustrates a configuration example of a main part of the air floating video display apparatus according to the example. The example in FIG. 2 illustrates a configuration in which the video display apparatus 1 and the retroreflector (in other words, retroreflection plate) 2 are arranged in an approximately V shape (hereinafter, referred to as V-shape configuration). As illustrated in FIG. 2, in the V-shape configuration, the video display apparatus 1 configured to generate the video light of a specific polarized wave is provided in an oblique direction (direction corresponding to optical axis A1) with respect to a transparent member 100 such as glass (arranged in horizontal direction in this example). Furthermore, the retroreflector 2 is provided in another oblique direction (direction corresponding to optical axis A2) with respect to the transparent member 100. The video display apparatus 1 includes a light source apparatus 13, a liquid crystal display panel 11 that is a liquid crystal display element, an absorption-type polarization plate 12, and the like. A beam splitter 101 (polarization separation member) that has a film for selectively reflecting the video light of a specific polarized wave is provided on the transparent member 100. In this example, the beam splitter 101 is formed in a sheet-like shape and is adhered to a lower surface of the transparent member 100.

In FIG. 2, the video light of a specific polarized wave emitted from the liquid crystal display panel 11 of the video display apparatus 1 travels on the optical axis A1, is reflected by the beam splitter 101 (polarization separation member) provided on the transparent member 100, travels on the optical axis A2, and enters the retroreflector 2. A λ/4 plate 21 is provided on a video light incident surface (in other words, retroreflection surface) of the retroreflector 2. In other words, the λ/4 plate 21 is a polarization conversion element, a retardation plate, or a λ/4 wave plate.

The video light of a specific polarized wave on the optical axis A2 from the beam splitter 101 is subjected to polarization conversion from the specific polarized wave (one polarization) to the other polarized wave, by passing through the λ/4 plate 21 twice in total at the time of entering the retroreflector 2 and at the time of emission from the retroreflector 2. Here, the beam splitter 101 configured to selectively reflect the video light of a specific polarized wave has a property of transmitting the video light of the other polarized wave after the polarization conversion. Therefore, the video light of the other polarized wave after the polarization conversion travels on the optical axis A2 and passes through the beam splitter 101. The video light that has passed through the beam splitter 101 forms and displays the air floating video 3 that is a real image, at a predetermined position outside the transparent member 100 in a direction of an optical axis A3 corresponding to the optical axis A2.

Note that the light that forms the air floating video 3 is a set of light rays converging from the retroreflector 2 to the optical image of the air floating video 3, and these light rays go straight even after passing through the optical image of the air floating video 3. Therefore, in the configuration of FIG. 2, when the user visually recognizes the air floating video 3 from the direction A indicated by an arrow corresponding to the optical axis A3, the air floating video 3 is visually recognized as a bright video. However, when another person visually recognizes the video from, for example, the direction B indicated by an arrow, the air floating video 3 cannot be visually recognized as a video at all. Such characteristics are very suitable in a case of being adopted in a system that displays a video requiring high security or a highly confidential video that is desired to be kept secret from a person facing the user.

Note that, depending on the performance of the retroreflector 2, the polarization axes of the video light after reflection become uneven in some cases. In this case, a part of the video light whose polarization axes become uneven is reflected by the beam splitter 101 described above and returns to the video display apparatus 1. This returned light is reflected again on the video display surface of the liquid crystal display panel 11 constituting the video display apparatus 1, so that the ghost image is generated and the image quality of the air floating video 3 is deteriorated in some cases. Therefore, in the present example, an absorption-type polarization plate 12 is provided on the video display surface of the video display apparatus 1. The video light emitted from the video display apparatus 1 is transmitted through the absorption-type polarization plate 12, and the reflected light returning from the beam splitter 101 is absorbed by the absorption-type polarization plate 12. In this way, the re-reflection described above can be suppressed, and it is possible to prevent deterioration in image quality due to the ghost image of the air floating video 3.

The beam splitter (polarization separation member) 101 described above may be formed of, for example, a reflection-type polarization plate or a metal multilayer film that reflects a specific polarized wave.

[Air Floating Video Display Apparatus (Z Shape)]

Figure 3:
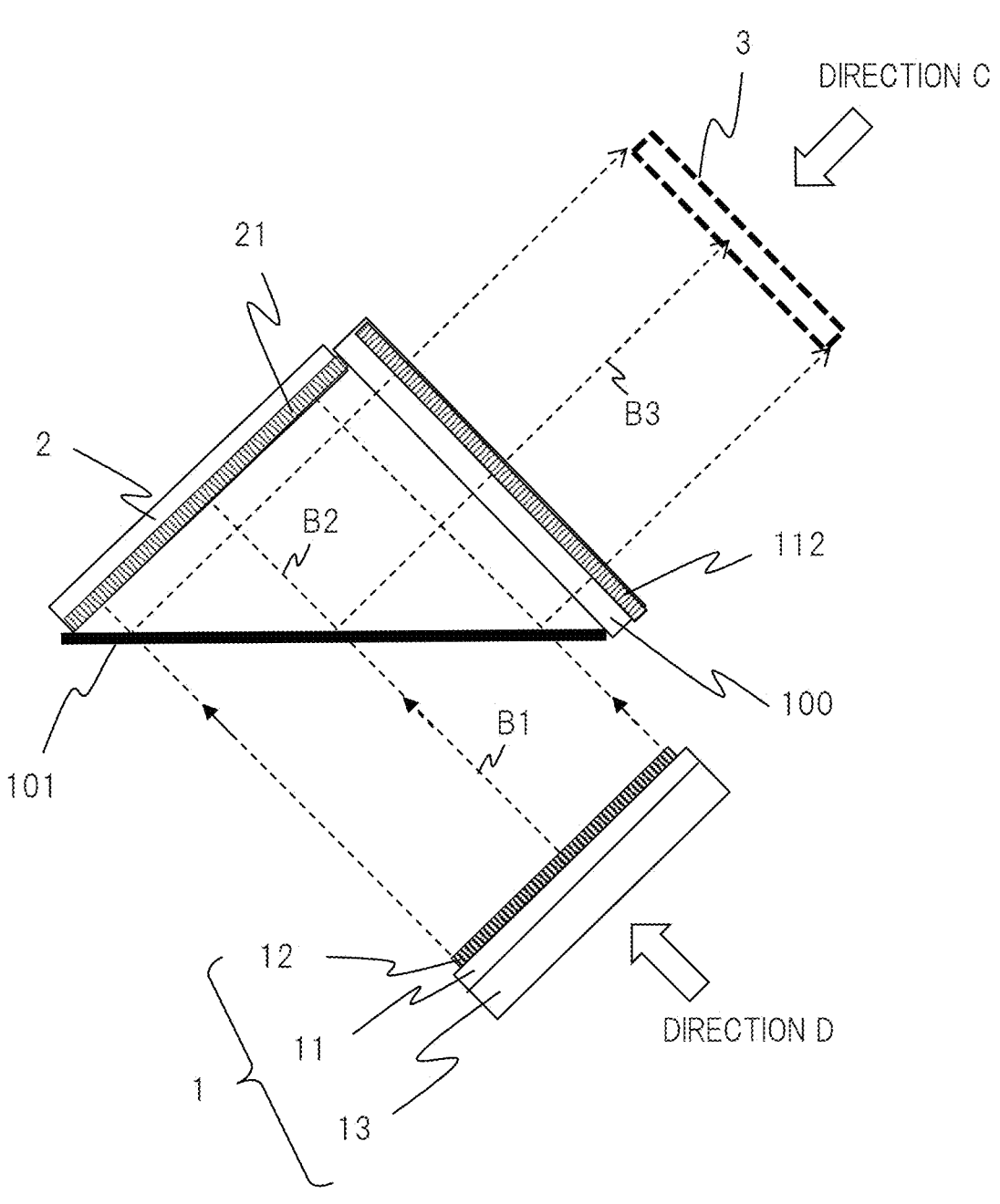
FIG. 3 is a diagram illustrating a Z-shape configuration as an example of the main part configuration of the air floating video display apparatus according to the example of the present invention.

FIG. 3 illustrates a configuration example of the main part of the air floating video display apparatus according to the example, different from the example in FIG. 2. The example in FIG. 3 illustrates a configuration in which the video display apparatus 1 and the retroreflector 2 (retroreflection plate) are arranged to face each other, and the beam splitter 101 is arranged in the space therebetween at an angle of about 45 degrees with respect to each of the video display apparatus 1 and the retroreflector 2 so as to form a schematically Z shape (or reverse Z shape) (hereinafter, referred to as Z-shape configuration). In this Z-shape configuration, with respect to the transparent member 100 such as a glass plate and an absorption-type polarization plate 112, the video display apparatus 1 and the retroreflector 2 are arranged at an angle of about 90 degrees, and the beam splitter 101 is arranged at an angle of about 45 degrees. In this example, the beam splitter 101 is arranged in the horizontal direction.

[Retroreflector]

FIG. 4(A) illustrates a surface shape of the retroreflector 2 (retroreflection plate) manufactured by Nippon Carbide Industries Co., Inc. used in this study as the typical retroreflector 2. FIG. 4(A) is a top view and FIG. 4(B) is a side view. On the surface of the retroreflector 2, the retroreflection portions 2a composed of regularly arranged hexagonal columns are provided. The light ray that has entered the retroreflection portion 2a is reflected by the wall surfaces and bottom surface of the hexagonal column and emitted as retroreflected light in a direction corresponding to the incident light. This emitted light forms the air floating video 3 as a normal image that is a normally reflected image in the configurations illustrated in FIG. 2 and FIG. 3. On the other hand, as illustrated in FIG. 4(B), the ghost image (not illustrated) is formed at the position different from the normal image by the video light, which has obliquely entered the retroreflector 2, of the video light from the video display apparatus 1. This ghost image lowers the visibility of the air floating video 3.

Thus, in the present example (FIG. 3), the air floating video 3 that is a real image is displayed based on the video displayed on the video display apparatus 1 without forming the ghost image. The resolution of the air floating video 3 largely depends on the outer diameter D and pitch P of the retroreflection portions 2a of the retroreflector 2 illustrated in FIG. 4(A), in addition to the resolution of the liquid crystal display panel 11. For example, when the liquid crystal display panel 11 of a 7-inch WUXGA (1920×1200 pixels) is used, even if one pixel (one triplet) is about 80 μm, one pixel of the air floating video 3 is about 300 μm if the diameter D of the retroreflection portion 2a is 240 μm and the pitch P is 300 μm, for example. Therefore, the effective resolution of the air floating video 3 is reduced to about ⅓. Therefore, in order to make the resolution of the air floating video 3 equal to the resolution of the video display apparatus 1, it is desired that the diameter D and the pitch P of the retroreflection portions 2a are close to one pixel of the liquid crystal display panel. On the other hand, in order to suppress the occurrence of moire caused by the retroreflector 2 and the pixels of the liquid crystal display panel 11, it is preferable to design each pitch ratio so as not to be an integral multiple of one pixel. Further, the shape is preferably arranged such that any one side of the retroreflection portion 2a does not overlap with any one side of one pixel of the liquid crystal display panel 11.

The inventors of this application fabricated the video display apparatus 1 by combining the liquid crystal display panel 11 with a pixel pitch of 40 μm and the light source apparatus 13 with a narrow divergence angle (divergence angle of) 15° of the present example, and obtained the relationship between the acceptable blur amount 1 (small L) of the image of the air floating video 3 and the pixel size L (large L) by experiment in order to improve the visibility. FIG. 5 illustrates the experimental results. It has been found that the blur amount 1 that deteriorates the visibility is preferably 40% or less of the pixel size, and the blur is almost unnoticeable if it is 15% or less. Also, it has been found that the surface roughness of the reflection surface by which the blur amount 1 is an acceptable amount in this case has an average roughness of 160 nm or less in the range of the measurement distance of 40 μm, and the surface roughness of the reflection surface is desirably 120 nm or less for achieving the more unnoticeable blur amount 1. Therefore, it is desirable to reduce the surface roughness of the retroreflector 2 described above and reduce the surface roughness including the reflection film forming the reflection surface and its protection film to the above-described value or less.

On the other hand, in order to manufacture the retroreflector 2 at a low cost, the retroreflector may be molded by using the roll press method. Specifically, the retroreflection portions 2a are aligned to be formed on a film. In this method, the retroreflector 2 having a desired shape is obtained by forming a reverse shape of the shape to be formed on a roll surface, applying an ultraviolet curable resin on a fixing base material, forming a necessary shape by passing the resin between rolls, and curing the resin by irradiation with ultraviolet rays.

The video display apparatus 1 of the present example includes the liquid crystal panel 11 and the light source apparatus 13 (details in FIG. 6) configured as a light source to generate a light of a specific polarized wave, and thus there is low probability that the video light enters obliquely with respect to the retroreflector 2 described above. As a result, it is possible to provide the structurally superior system in which the generation of the ghost image can be suppressed and the brightness of the ghost image is low even if the ghost image is generated.

On the other hand, in the configuration of the Z-shape air floating video display apparatus illustrated in FIG. 3, the video display apparatus 1 including the liquid crystal display panel 11, the absorption-type polarization plate 12, and the light source apparatus 13 is arranged at a predetermined angle (for example, at an angle of about 45 degrees with respect to the beam splitter 101 on horizontal plane). The video light from the video display apparatus 1 passes through the beam splitter 101 in a direction of an optical axis B1 (oblique direction with respect to the beam splitter 101) and travels toward the retroreflector 2 in a direction of an optical axis B2 corresponding to the optical axis B1.

Here, the video light from the video display apparatus 1 is, for example, a video light having characteristics of P polarization (parallel polarization) as the light of a specific polarized wave. Furthermore, the beam splitter 101 is a polarization separation member such as a reflection-type polarization plate and has a property of transmitting the video light of P polarization from the video display apparatus 1 and reflecting the video light of S polarization (orthogonal polarization) conversely. This beam splitter 101 is formed of a reflection-type polarization plate or a metal multilayer film that reflects the specific polarized wave.

On the other hand, the λ/4 plate 21 is provided on the retroreflection surface that is a light incident surface of the retroreflector 2. The video light of P polarization that has passed through the beam splitter 101 from the video display apparatus 1 is subjected to polarization conversion from the P polarization to the S polarization, by passing through the λ/4 plate 21 twice in total at the time of entering the retroreflector 2 and at the time of emission from the retroreflector 2. As a result, the video light of S polarization from the retroreflector 2 after the polarization conversion is reflected by the beam splitter 101 and travels toward the transparent member 100 or the like. The reflected video light of S polarization that has traveled in a direction corresponding to an optical axis B3 (oblique direction with respect to the beam splitter 101) passes through the transparent member 100 such as a glass plate and the absorption-type polarization plate 112, and generates and displays the air floating video 3 that is a real image at a predetermined position outside the transparent member 100 or the like.

Here, in order to suppress the deterioration in the image quality due to sunlight and illumination light entering the video display apparatus 1 and the optical system composed of optical components such as the retroreflector 2 and the beam splitter 101, it is effective to provide the absorption-type polarization plate 112 on an outer surface of the transparent member 100. Since the polarization axes become uneven in some cases when the light is retroreflected by the retroreflector 2, a part of the video light is reflected by the beam splitter 101 and is returned toward the video display apparatus 1 in some cases. This returned light is reflected again by the video display surface of the liquid crystal display panel 11 constituting the video display apparatus 1, so that the ghost image is generated and the image quality of the air floating video 3 is significantly deteriorated.

Therefore, in both of the examples illustrated in FIG. 2 and FIG. 3, the absorption-type polarization plate 12 is provided on the video display surface of the video display apparatus 1. Alternatively, an antireflection film (not illustrated) may be provided on a video emission side surface of the absorption-type polarization plate 12 provided on the surface of the video display apparatus 1. In this way, the light to be the cause of generating the ghost image is absorbed by the absorption-type polarization plate 12, whereby the deterioration in the image quality due to the ghost image of the air floating video 3 is prevented.

Moreover, in the Z-shape configuration in FIG. 3, a strong ghost image is generated when external light directly enters the retroreflector 2. Therefore, in order to suppress and prevent the generation of the ghost image, this example has the configuration in which the retroreflector 2 is inclined downward with respect to an incident direction of the external light for preventing the external light from entering. Specifically, a main incident direction of the external light is set to a direction (oblique direction like the optical axis B3) corresponding to a direction C indicated by an arrow (direction in which user visually recognizes the air floating video 3 from front side). In that case, the retroreflector 2 is arranged such that the optical axis B2 has a relationship of, for example, about 90 degrees with respect to the direction C (optical axis B3). In other words, a main surface of the retroreflector 2 is arranged so as to have a relationship of, for example, about 90 degrees with respect to a main surface of the transparent member 100 or the like. In this way, since the external light entering in the direction C does not directly enter the main surface (retroreflection surface) of the retroreflector 2, the generation of the ghost image is prevented.

Furthermore, the video display apparatus 1 is arranged in a direction different from the incident direction of the external light (direction C). Specifically, the main surface (video light emission surface) of the video display apparatus 1 is arranged in the same direction as (in other words, in parallel to) the main surface of the retroreflector 2, and the optical axis B1 of the video display apparatus 1 is arranged to have a relationship of about 90 degrees with respect to the optical axis B3 corresponding to the incident direction of the external light (direction C). Furthermore, when a range of a light flux in a case where the external light enters the main surface of the transparent member 100, which functions as an opening, in the direction C is considered, the video display apparatus 1 is arranged at a position slightly separated to the outside from that range. As a result, the generation of the ghost image due to the re-reflection in the video display apparatus 1 is reduced.

[Video Display Apparatus]

Figure 6:
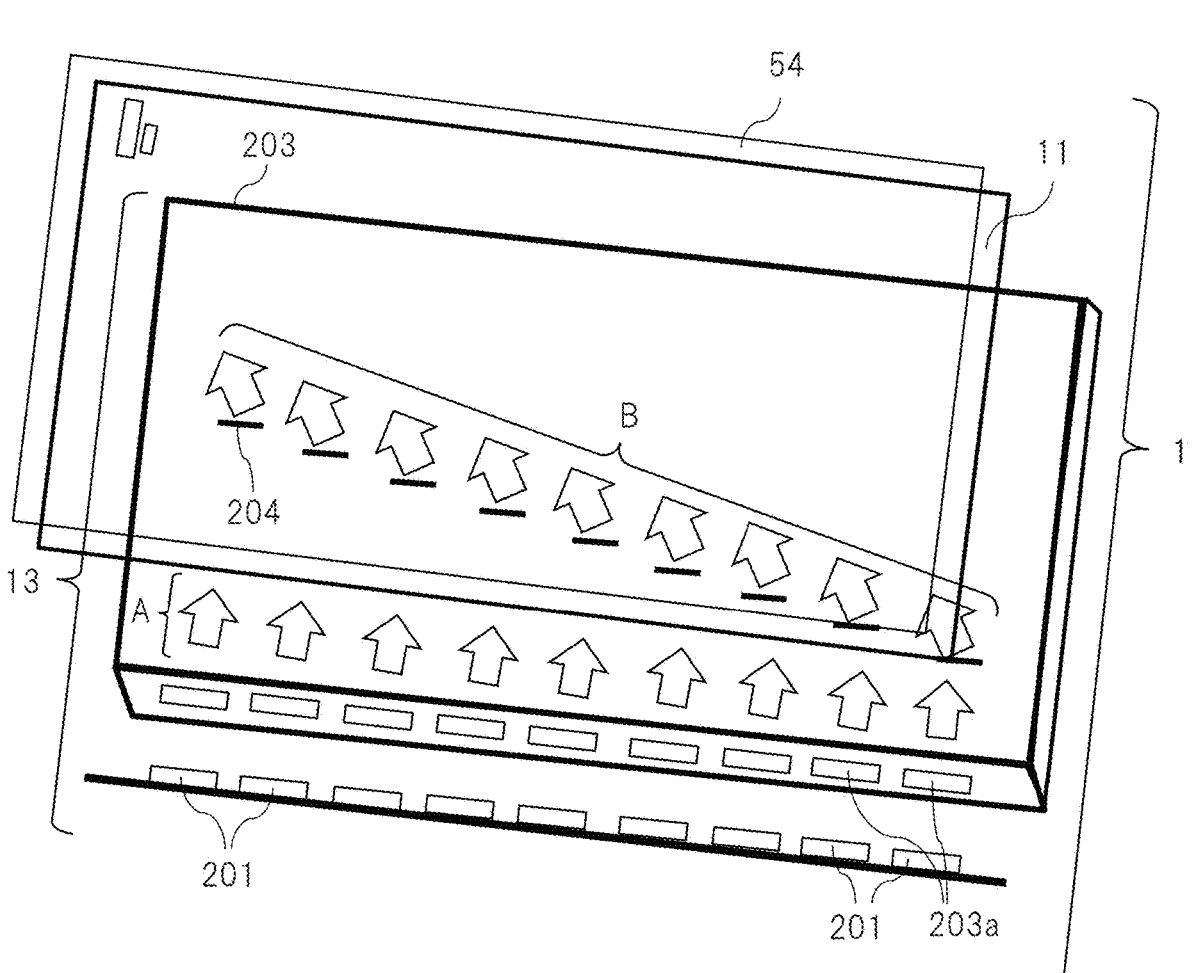
FIG. 6 is a diagram illustrating a configuration example of a video display apparatus.

FIG. 6 illustrates a configuration example of the video display apparatus 1 that is applicable to the examples in FIG. 2 and FIG. 3. The video display apparatus 1 includes the light source apparatus 13, the liquid crystal display panel 11, a light direction conversion panel 54, and the like. On a video emission surface side of the liquid crystal display panel 11, the absorption-type polarization plate 12 described above may be provided. The light source apparatus 13 is composed of a plurality of light emitting diode (LED) elements 201 that is a semiconductor light source (solid light source) constituting a light source, a light guide body 203, and the like. In FIG. 6, a state where the liquid crystal display panel 11 and the light direction conversion panel 54 are arranged on the light source apparatus 13 is illustrated as an exploded perspective view.

The light source apparatus 13 is formed of, for example, a case (not illustrated) made of plastic or the like and is configured to store the LED elements 201 and the light guide body 203 therein. A light receiving end surface 203a is provided on an end surface of the light guide body 203 in order to convert divergent light from each LED element 201 into a substantially parallel light flux. The light receiving end surface 203a has a shape whose cross sectional area gradually increases toward a facing surface with respect to the light receiving portion, and is provided with a function of gradually decreasing a divergence angle by making total reflection plural times during propagation therein.

Moreover, on an upper surface of the light guide body 203, the liquid crystal display panel 11 that is arranged substantially parallel to the light guide body 203 is attached. Furthermore, on one side surface (side surface on the lower side in FIG. 6) of the case of the light source apparatus 13, the plurality of LED elements 201 is attached. The light from the plurality of LED elements 201 is converted into substantially collimated light (substantially parallel light) by the shape of the light receiving end surface 203a of the light guide body 203. Therefore, the light receiving portion of the light receiving end surface 203a and the LED element 201 are attached so as to maintain a predetermined positional relationship.

The light source apparatus 13 is configured by attaching a light source unit, in which the plurality of LED elements 201 serving as a light source is arranged, to the light receiving end surface 203a serving as the light receiving portion provided on the end surface of the light guide body 203. A divergent light flux from the LED element 201 is converted into the substantially collimated light by a lens shape of the light receiving end surface 203a of the light guide body 203. The substantially collimated light is guided in the direction A indicated by the arrow inside the light guide body 203. The direction A is a direction substantially parallel to the liquid crystal display panel 11 (direction from bottom to top in drawing). A light flux direction of the light guided in the direction A is converted by a light flux direction converter 204 provided in the light guide body 203, and the light is emitted in a direction B indicated by an arrow toward the liquid crystal display panel 11 substantially parallel to the light guide body 203. The direction B is a direction substantially perpendicular to a display surface of the liquid crystal display panel 11.

The light guide body 203 has a configuration in which a distribution (in other words, density) of the light flux direction converter 204 is optimized by the shape of the inside or the surface of the light guide body 203. Accordingly, it is possible to control uniformity of light that is an emission light flux from the light source apparatus 13 indicated by the direction B and is an incident light flux to the liquid crystal display panel 11.

Moreover, in the video display apparatus 1 configured to include the light source apparatus 13 and the liquid crystal display panel 11, it is also possible to control directivity of the light from the light source apparatus 13 in the direction B in order to improve utilization efficiency of the emission light flux from the light source apparatus 13 indicated by the direction B and largely reduce power consumption. More specifically, a light source that has a narrow divergence angle can be configured as the light source apparatus 13. As a result, the video light from the video display apparatus 1 efficiently reaches an observer with high directivity (in other words, straightness) like laser light, and it is possible to display a high-quality air floating video with high resolution. At the same time, power consumption by the video display apparatus 1 including the LED elements 201 of the light source apparatus 13 can be significantly reduced.

Also, to a frame (not illustrated) of the liquid crystal display panel 11 attached to the upper surface of the case (not illustrated) of the light source apparatus 13, the liquid crystal display panel 11 attached to the frame, a flexible printed circuits (FPC) board (not illustrated) electrically connected to the liquid crystal display panel 11, and the like are attached. The liquid crystal display panel 11 which is a liquid crystal display element generates a display video together with the LED element 201 by modulating the intensity of transmitted light based on a control signal from a control circuit (not illustrated) constituting an electronic device.

<In-Vehicle Air Floating Video Display Apparatus (V Shape)>

Next, an in-vehicle air floating video display apparatus according to each example will be described with reference to FIG. 7 and subsequent drawings. The air floating video display apparatus according to each example below corresponds to the V-shape configuration in FIG. 2 described above as a basic configuration. For the function to form the air floating video 3, the components (video display apparatus 1, beam splitter 101, retroreflector 2, and the like) of the air floating video display apparatus are fixed to each other so as to have a predetermined positional relationship.

[External Configuration Example of Air Floating Video Display Apparatus]

FIG. 7 illustrates an example of an external configuration of the air floating video display apparatus suitable for in-vehicle use according to an example. The in-vehicle air floating video display apparatus according to the example in FIG. 7 roughly includes a video controller 300 and an air floating video display 400. FIG. 7 illustrates the external appearance of the air floating video display 400 when viewed from the lateral side (X direction in the drawing) with respect to the front side of the apparatus. For description, a coordinate system and a direction such as (X, Y, Z) illustrated in the drawings are used in some cases. The X direction is the left and right direction of the apparatus, the Y direction is the front and back direction of the apparatus, and the Z direction is the top and bottom direction of the apparatus. The X direction and the Y direction are horizontal directions, and the Z direction is a vertical direction.

The user visually recognizes the air floating video 3 (indicated by broken line frame) formed by the air floating video display 400 approximately in the Y direction. The front side of the apparatus is a surface corresponding to the case where the user visually recognizes the air floating video display 400 approximately in the Y direction. As will be described in detail later, the user suitably views the air floating video 3 by the air floating video display 400 in a line-of-sight direction (corresponding to direction E in the drawing) that is slightly obliquely upward from the viewpoint in the Y direction with respect to the front side of the apparatus. In particular, the arrangement of the retroreflector 2 in the configuration of the example illustrated in FIG. 7 corresponds to that in the configuration in FIG. 8B (second example) described later.

The video controller 300 is mounted and stored in a housing 107 (in other words, video controller container) that is the first housing. The video controller 300 is a part in which the video controller 1*b*, the video signal receiver 1*c*, and the like in FIG. 1(B) are mounted. In the housing 107, a circuit board or the like that is a mounted object of the video controller 1*b*, the video signal receiver 1*c*, and the like is stored. The video controller 300 includes the video signal processing circuit configured to generate and supply a video signal and a control signal to the video display apparatus 1, the memory configured to accumulate data and information such as the video materials, the power supply circuit configured to convert a voltage supplied from a battery of the vehicle into a predetermined voltage, and the like as described above.

The video display apparatus 1 (schematically illustrated) of the air floating video display 400 is mounted and stored in the housing 106 (video display apparatus container) that is the second housing. The light source apparatus 13, the liquid crystal display panel 11, the absorption-type polarization plate 12, and others described above (similar to those in FIG. 2) constituting the video display apparatus 1 are stored and fixed in the housing 106. The housing 107 and the housing 106 are connected by a wired cable 105. The cable 105 is composed of a control signal line, a power supply line, and the like. In a modification, the housing 107 and the housing 106 may be connected wirelessly (for example, by near field communication interface such as Wi-Fi).

The air floating video display 400 is a part in which the video display 1*a* in FIG. 1(B) is mounted, and is configured to include the housing 106 in which the video display apparatus 1 is stored, and the beam splitter 101, the retroreflector 2 provided with the λ/4 plate 21, a support column 108, and the like arranged on the lower side outside the housing 106. As in FIG. 2, the λ/4 plate 21 is provided on the retroreflection surface of the retroreflector 2. For example, the λ/4 plate 21 is attached to the surface of the retroreflector 2. An opening 1061 is formed in the lower surface of the housing 106, and the video light from the video display apparatus 1 in the housing 106 is emitted through the opening 1061 to the lower side (Z direction, the direction of the thick arrow in FIG. 7). In this example, the video light of a specific polarized wave emitted from the video display apparatus 1 is S-polarized light.

In the example in FIG. 7, the arrangement relationship of the beam splitter 101, the video display apparatus 1, and the retroreflector 2 is the V-shape configuration as in FIG. 2. The same arrangement relationship of the components as that in FIG. 2 can be obtained by rotating the components in FIG. 7 (beam splitter 101, video display apparatus 1, retroreflector 2) in the drawing. Namely, in the arrangement relationship in the V-shape configuration, the video display apparatus 1 is arranged obliquely at about 45 degrees with respect to one end of the beam splitter 101, and the retroreflector 2 is arranged obliquely at about 45 degrees with respect to the other end of the beam splitter 101 (about 90 degrees with respect to the video display apparatus 1). In the arrangement relationship in FIG. 7, the main surface of the video display apparatus 1 (in particular, the liquid crystal display panel 11) is arranged in the horizontal direction (Y direction), and the retroreflector 2 is arranged at about 90 degrees with respect to the video display apparatus 1. Further, the beam splitter 101 is arranged obliquely at about 45 degrees with respect to the video display apparatus 1 and the retroreflector 2 (the main surface of the beam splitter 101 is directed obliquely upward from the rear side to the front side in the Y direction).

The video light of S polarization emitted downward in the Z direction from the video display apparatus 1 is reflected by the beam splitter 101 and directed toward the retroreflector 2. The video light of S polarization reflected by the beam splitter 101 is retroreflected by the retroreflector 2, is subjected to polarization conversion to the video light of P polarization that is the video light of the other polarized wave by passing through the λ/4 plate twice in twice, and returns to the beam splitter 101. The video light of P polarization after the polarization conversion passes through the beam splitter 101 and forms and displays the air floating video 3 (indicated by a broken line) at a predetermined position on the front side in the Y direction.

The housing 106 is referred to as "thin housing" in some cases. The thin housing mentioned here means that a thickness of the housing 106 is suppressed to be relatively small in comparison with those in the directions perpendicular to it (width and depth dimensions). In the present example, as illustrated in the drawing, the air floating video display 400 is separated from the housing 107 of the video controller 300, and has the configuration in which the beam splitter 101, the retroreflector 2, and the like are arranged outside the housing 106 so as to be exposed without being covered with the housing. Therefore, the housing 106 is relatively small (compact) and has a thin shape with a small thickness as described above.

In the present example, a liquid crystal display apparatus of approximately three inches is adopted as the liquid crystal display panel 11. Correspondingly, in the present example, as to the dimensions and the shape of the thin housing 106, when viewed from the side of the air floating video 3 (Y direction), the width is 55 mm, the depth is 90 mm, and the thickness is 23 mm. As will be described later, in the air floating video display apparatus according to the present example, an upper surface portion of the housing 106 is fixed to a ceiling portion in the vehicle. Therefore, it is desirable that the housing 106 has a thin shape to such an extent that the presence of the housing 106 is not noticeable as possible when viewed from a driver and other passengers. Furthermore, the housing 106 needs to store the video display apparatus 1 including the light source apparatus 13 and the liquid crystal display panel 11 and further secure a space for dissipating heat generated from the light source apparatus 13. In consideration of these, the thickness of the housing 106 is set to 23 mm in the present example.

[Support Column]

As illustrated in FIG. 7, the optical system composed of the beam splitter 101 and the retroreflector 2 on which the λ/4 plate 21 is formed (described in detail in FIG. 8) is arranged and fixed so as to be held by the support column 108 on the lower side of the housing 106 in which the video display apparatus 1 is stored. In the present example, the beam splitter 101 has a rectangular main surface, and the retroreflector 2 also has a rectangular main surface. Correspondingly, the support column 108 has a shape that supports the edges (at least the left and right sides) of the beam splitter 101 and the edges (at least the left and right sides) of the retroreflector 2. With this configuration, the video display apparatus 1, the beam splitter 101, and the retroreflector 2 maintain the positional relationship in FIG. 7.

The support column 108 is a support, a support member, or a support tool having a columnar shape, a bar-like shape, an elongated long plate shape, or the like, in other words, a fixing portion or a suspension. The support column 108 is a member, a tool, or a mechanical structure that supports and fixes the beam splitter 101 and the retroreflector 2 so as to be suspended on the lower side of the housing 106.

As a material of the support column 108, metal such as aluminum or iron, resin, or the like can be used. It is preferable that the sense of floating in the air of the air floating video 3 is made conspicuous and the components other than the air floating video 3 are not noticeable as possible when the user visually recognizes the air floating video 3. Therefore, the support column 108 is not formed as a housing that covers the beam splitter 101 and the like, and is formed to have, for example, a columnar shape so as to minimize a volume while securing rigidity and strength for support.

A configuration example of the support column 108 in FIG. 7 is as follows. Specifically, the support 108 includes a support column 108*a*, a support column 108*b*, and a support column 108*c*, and they are connected to each other. The support column 108*a* is a columnar support portion that extends downward from the left and right corners of the lower surface of the housing 106 on the front side in the Y direction to the vicinity of the left and right corners of the beam splitter 101 on the front side. The support column 108*b* is a columnar support portion that extends obliquely downward and backward along the edges of the beam splitter 101 from the vicinity of the left and right corners of the beam splitter 101 on the front side to the vicinity of the left and right corners of the beam splitter 101 on the rear side (in other words, to the vicinity of the lower end of the retroreflector 2). The support column 108*c* is a columnar support portion that extends vertically upward along the edges of the retroreflector 2 from the vicinity of the left and right corners of the beam splitter 101 on the rear side to the vicinity of the left and right corners of the upper end of the retroreflector 2. A columnar support portion connecting along the upper side of the retroreflector 2 may be provided at the upper end of the support column 108*c*.

Here, the material of the support column 108 will be described. The support column 108 is preferably made of a material that is lightweight and resistant to vibrations. The material of the support column 108 may be, for example, metal such as aluminum or a resin material such as plastic. In any case, it is desirable that the surface of the support column 108 has a light shielding property to prevent reflection of external light such that external light such as sunlight that enters the interior of the vehicle is not reflected as much as possible.

Furthermore, in order to make the sense of floating in the air of the air floating video 3 (sense of seeing as if only the video is floating in the air) more conspicuous, it is desirable that the support column 108 is less noticeable when viewed from the user. In that case, the support column 108 may be made of a material having a property close to transparent (light transmissive property), for example, light transmissive resin.

In the case where the support column 108 extending downward from the housing 106 is made of a transparent member, the housing that is in the field of view of the user is only the thin housing 106 when the air floating video 3 is viewed from a viewpoint of the user, that is, from the front side of the apparatus (direction E). Therefore, the present example is suitable for use because there are few objects that obstruct the user's field of view and the sense of floating in the air of the air floating video 3 can be enhanced.

[Structural Example of Air Floating Video Display]

Figure 8A:
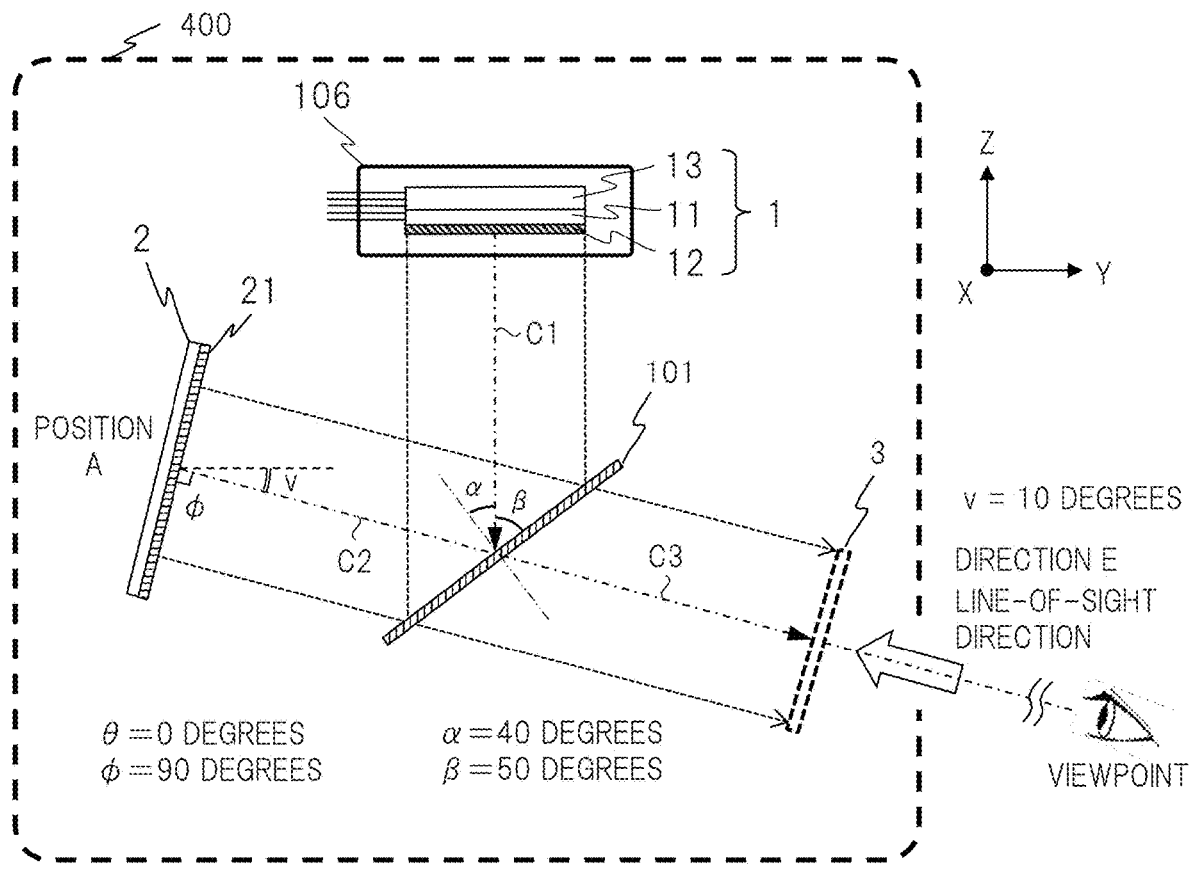
FIG. 8A is a diagram illustrating a configuration of an air floating video display apparatus according to an example (first example) of the present invention.
Figure 8B:
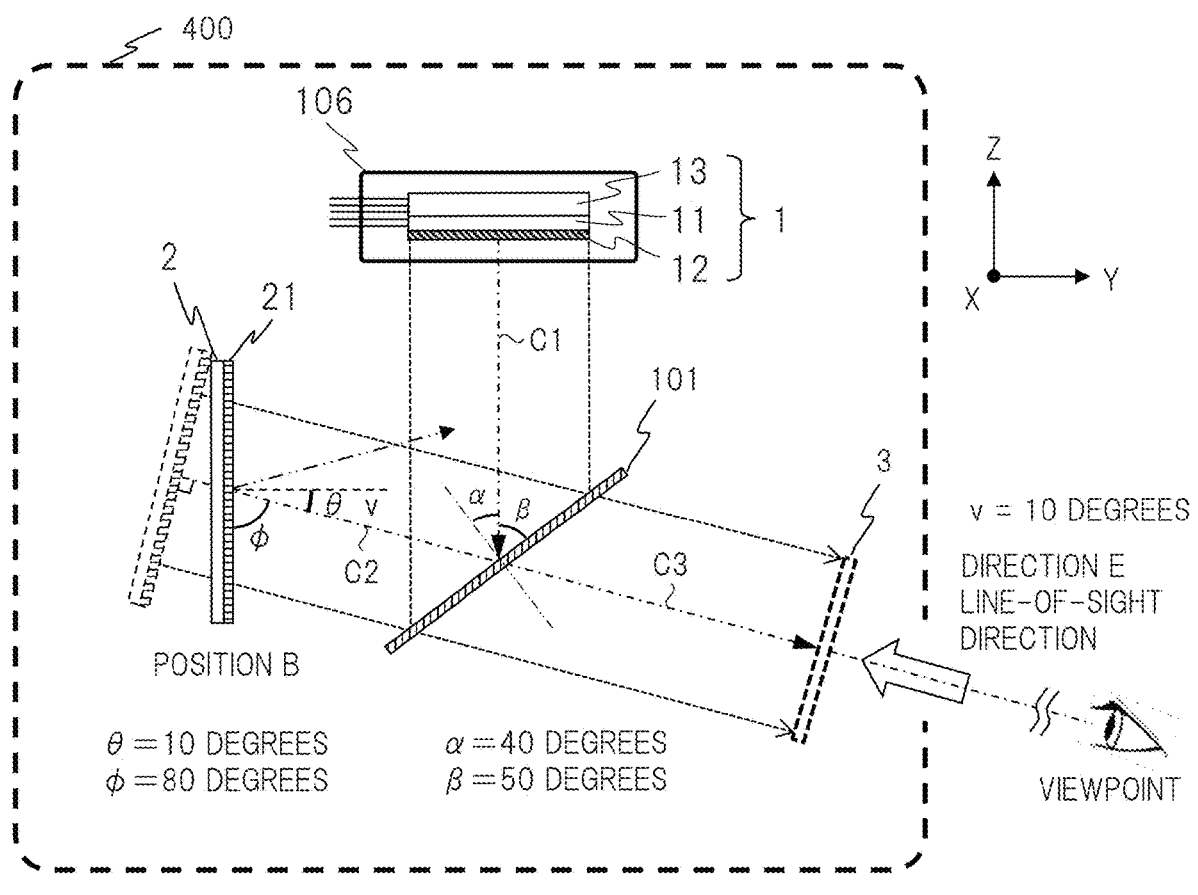
FIG. 8B is a diagram illustrating a configuration of an air floating video display apparatus according to an example (second example) of the present invention.

Next, a structural example of the optical system and the like of the air floating video display in the example of FIG. 7 will be described in more detail with reference to FIG. 8A and FIG. 8B. FIG. 8A illustrates an example (referred to as first example) related to the structure of the air floating video display 400 in FIG. 7, and FIG. 8B illustrates another example (referred to as second example) related to the structure of the air floating video display 400 in FIG. 7.

First Example

Figure 9:
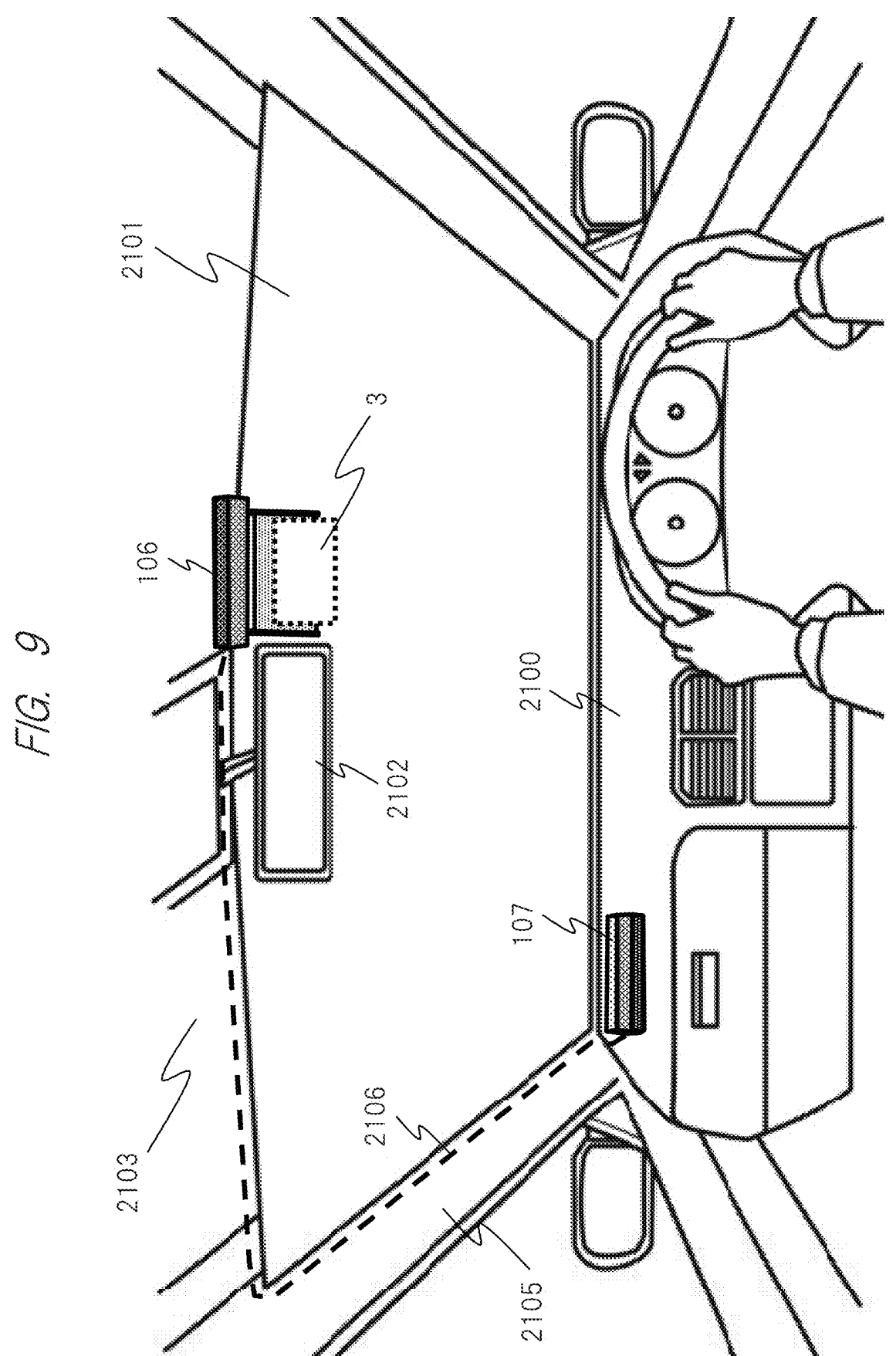
FIG. 9 is a diagram illustrating an installation example (first installation example) of an in-vehicle air floating video display apparatus according to the example of the present invention.
Figure 10:
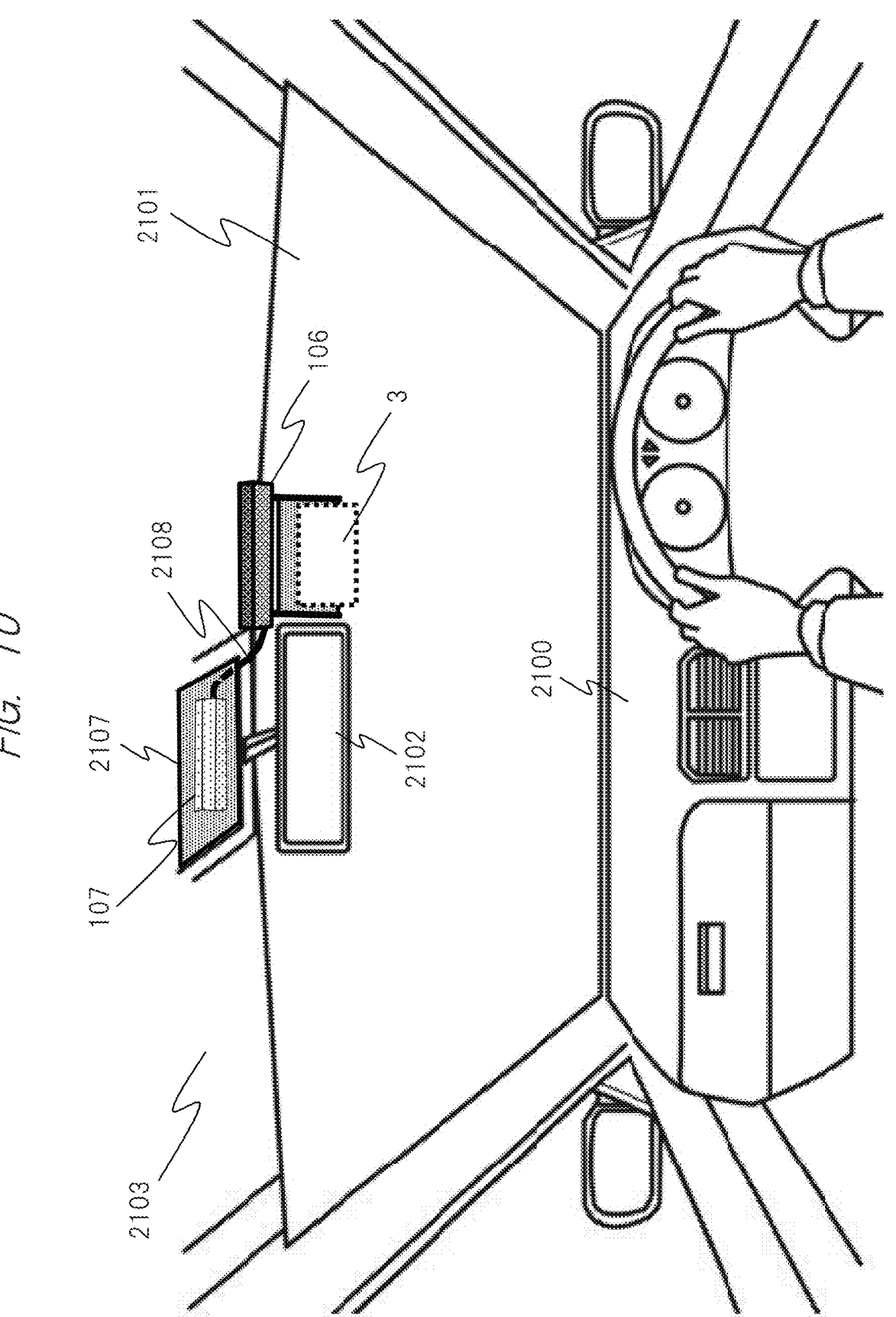
FIG. 10 is a diagram illustrating another installation example (second installation example) of the in-vehicle air floating video display apparatus according to the example of the present invention.

First, FIG. 8A illustrates the structure in the case where the air floating video display 400 of the air floating video display apparatus according to the first example is viewed from a lateral side (X direction). In FIG. 8A, the air floating video display 400 indicated by a broken line frame has the housing 106 fixed to the ceiling portion, which is an upper portion in the vehicle, as illustrated in FIG. 9 or FIG. 10 described later. In the video display apparatus 1 stored in the housing 106, the light source apparatus 13, the liquid crystal display panel 11, and the absorption-type polarization plate 12 are arranged schematically in this order from above in the cross section illustrated in the drawing. The video display apparatus in FIG. 6 described above can be similarly applied to this video display apparatus 1.

The video light from the video display apparatus 1 is emitted directly downward in the vertical direction (Z direction) toward the beam splitter 101. The direction of this video light is indicated by an optical axis C1 of a dot-dashed line, and the broken lines on both sides indicate the range of the light flux. The video light emitted from the liquid crystal display panel 11 is, for example, the video light having S polarization (orthogonal polarization). This video light of S polarization enters the beam splitter 101 arranged obliquely on the optical axis C1 at an incident angle α and is reflected by the beam splitter 101. The incident angle α in the first example in FIG. 8A is 40 degrees. An angle β between the optical axis C1 and the main surface of the beam splitter 101 is 50 degrees.

The video light of S polarization reflected by the beam splitter 101 travels toward the retroreflector 2 and the like on the rear side in the Y direction in the slightly obliquely upward direction indicated by the optical axis C2. The direction of the optical axis C2 is a direction of 80 degrees with respect to the optical axis C1, and is an obliquely upward direction of 10 degrees with respect to the horizontal direction. The λ/4 plate 21 is provided on the light incident surface of the retroreflector 2. The video light reflected by the beam splitter 101 based on the video light of S polarization from the video display apparatus 1 is subjected to polarization conversion by passing through the λ/4 plate 21 twice in total on the optical axis C2 at the time of entering (before reflection) and emission (after reflection) at the retroreflector 2. Specifically, the S polarization (orthogonal polarization) is converted into P polarization (parallel polarization). As a result, the video light of P polarization after being reflected by the retroreflector 2 returns to the beam splitter 101 on the optical axis C2, passes through the beam splitter 101, and travels on the optical axis C3 corresponding to the optical axis C2 after passing through the beam splitter 101. Then, as illustrated in FIG. 8A, the video light of P polarization forms and displays the air floating video 3 that is a real image at a position of a predetermined distance on the optical axis C3 on the front side of the beam splitter 101. The position where the air floating video 3 is formed is determined depending on the design of the video display apparatus 1 and the optical system.

Here, in the first example illustrated in FIG. 8A, the retroreflector 2 including the λ/4 plate 21 is arranged at a position A illustrated in the drawing. The position A is a position where the main surface of the retroreflector 2 is perpendicular to the optical axis C2 of the video light from the beam splitter 101 such that the incident angle θ is 0 degrees (the angle φ between the optical axis C2 and the main surface of the retroreflector 2 is 90 degrees). The retroreflector 2 is arranged at the position A such that the main surface is slightly inclined obliquely downward. When the angle that the optical axis C2 of the retroreflector 2 (in other words, the optical axis of the video light forming the air floating video 3) forms with respect to the horizontal direction (Y direction) is v, the angle v is 10 degrees (v=10 degrees).

As illustrated in FIG. 8A, the air floating video 3 is generated at the position slightly below and on the front side of the beam splitter 101 on the optical axes C2 and C3 in the slightly obliquely downward direction at the angle v of 10 degrees with respect to the retroreflector 2. In other words, the air floating video 3 in the first example is generated in a direction inclined to the lower right side in the drawing at the angle v with respect to the horizontal line. As a result, when the user visually recognizes the air floating video 3 from the front side of the apparatus, the line of sight of the user is directed slightly upward from the lower side, as indicated by the line-of-sight direction corresponding to the direction E. As will be described later (FIG. 9 and FIG. 10), a driver in a vehicle as a user can visually recognize the air floating video 3 in a quite natural direction when looking up the vicinity of the rearview mirror at the top in the vehicle.

In the examples illustrated in FIG. 7 to FIG. 8B, in order to enhance the sense of floating in the air of the air floating video 3 for in-vehicle use (FIG. 9 and FIG. 10), the direction of the optical axes C2 and C3 for emitting and forming the air floating video 3 is set to a slightly obliquely downward direction with respect to the horizontal direction, and specifically, the angle v is set to 10 degrees. For example, as illustrated in FIG. 9 described later, the air floating video 3 by the air floating video display 400 is visually recognized in a slightly obliquely upward direction from the viewpoint of the driver. At that time, the air floating video 3 can be visually recognized at a position slightly shifted on the front and lower side with respect to the housing 106 and the retroreflector 2. Therefore, according to such an example, the sense of floating in the air of the air floating video 3 can be further enhanced as compared with the case where the air floating video 3 is emitted and formed on the horizontal optical axis.

Here, the direction (direction E) and angle (angle v) of the line of sight when the user visually recognizes the air floating video 3 are mainly determined by the relationship with the arrangement angle (angle α, β) of the beam splitter 101 with respect to the video light. In the first example in FIG. 8A, the arrangement of the beam splitter 101 is determined by setting the angle α to 40 degrees and the angle β to 50 degrees in order to set the angle v to 10 degrees.

Note that, in the structures illustrated in FIG. 7 to FIG. 8B, the direction of forming the air floating video 3 and the direction of the line of sight of the user can be made to be slightly oblique directions by setting the angle v to 10 degrees. Apart from that, though not illustrated, an upper surface portion of the housing 106 can be fixed to the ceiling portion of the vehicle by using an attachment fitting such as a ball joint. In this way, the direction of the air floating video display 400 including the housing 106 and the optical system can be made variable, so that it is possible to adjust the direction so as to match the viewpoint position and line-of-sight direction of the user who visually recognizes the air floating video 3.

[Study about Incident Angle on Retroreflector]

Next, the arrangement direction of the retroreflector 2 and the like will be studied. Although it depends on the implementation, the retroreflector 2 is basically capable of retroreflection regardless of the light incident direction, and the retroreflection is possible as long as the incident angle with respect to the incident video light is within a certain range. In the first example in FIG. 8A, the angle φ that the main surface of the retroreflector 2 forms with respect to the video light on the optical axis C2 from the beam splitter 101 is 90 degrees (φ=90 degrees), that is, the retroreflection surface is perpendicular to the incident video light. Although it depends on the implementation, when the incident angle θ of the video light with respect to the retroreflector 2 is perpendicular (0 degrees), the retroreflection can be performed most efficiently, so that the above-mentioned ghost image is least likely to occur and the brightness of the air floating video 3 can be increased. In consideration of such effects, the retroreflector 2 is arranged at the position A in the first example in FIG. 8A.

However, another problem may occur when the incident angle θ with respect to the retroreflector 2 is set to 0 degrees like the case of the position A in the first example in FIG. 8A. This will be described below. In the configuration of FIG. 8A, although it depends on the implementation, specular reflection may occur on the surface of the λ/4 plate 21 attached to the surface of the retroreflector 2 when the video light enters the retroreflector 2. There is a possibility that the image (specular reflection image) caused by the specular reflection on the λ/4 plate 21 will be visually recognized behind the air floating video 3 when viewed from the user in the Y direction. In that case, the specular reflection image may cause discomfort to the user, and the visibility of the air floating video 3 may be lowered.

Thus, the arrangement of the retroreflector 2 in the first example in FIG. 8A is devised to form the configuration of the second example in FIG. 8B. In the second example, the effect of preventing and suppressing the reduction in visibility due to the specular reflection image of the λ/4 plate 21 described above can be achieved by arranging the retroreflector 2 at a position B.

Second Example

In the second example in FIG. 8B, the retroreflector 2 is arranged at the position B perpendicularly to the video display apparatus 1 so as to stand in the vertical direction (Z direction). The position B is the position where the retroreflector 2 is not perpendicular to the slightly obliquely upward incident video light on the optical axis C2 from the beam splitter 101 and the main surface of the retroreflector 2 stands in the vertical direction (Z direction) such that the incident angle θ is 10 degrees (=angle v), and is the position where the retroreflector 2 is arranged at 90 degrees with respect to the video display apparatus 1. Note that, in FIG. 8B, as to the incident angle θ, the direction in which the angle increases downward in the Z direction with respect to the horizontal direction is set as the positive direction of the angle (to make the specular reflection light described later an obliquely upward direction).

As a result of the arrangement at the position B, the incident angle θ of the video light on the optical axis C2 reflected by the beam splitter 101 with respect to the retroreflector 2 becomes 10 degrees (θ=10 degrees) instead of being perpendicular (θ=0 degrees) as in the case of the position A in FIG. 8A. In the case of the position B, the angle φ formed by the main surface of the retroreflector 2 with respect to the video light on the optical axis C2 is 80 degrees (θ+φ=90 degrees). This angle φ (=80 degrees) differs from the angle φ (=90 degrees) in the case in FIG. 8A by 10 degrees (θ=v=10 degrees).

When the incident angle θ to the retroreflector 2 is set to 10 degrees as in the second example in FIG. 8B, although the generation of the ghost image due to the retroreflector 2 is observed slightly, the quality deterioration of the air floating video 3 due to the ghost image is almost nothing. On the other hand, if the incident angle θ is made as large as possible within a predetermined range, the generation of the specular reflection image by the λ/4 plate 21 can be prevented. In terms of the characteristics corresponding to the mounting example of the retroreflector 2 and the λ/4 plate 21, it is desirable that the incident angle θ is set within the range up to 10 degrees.

As a result of the above study, in the second example, the incident angle θ to the retroreflector 2 is set to 10 degrees (θ=v=10 degrees) and the angle φ is set to 80 degrees (φ=80 degrees) as the well-balanced design in effects in order to prevent the specular reflection image by the λ/4 plate 21 from being visually recognized and make the influence of the ghost image by the retroreflector 2 less noticeable.

In other words, in the second example, in consideration of both the adverse effects of the decrease in visibility and brightness of the air floating video 3 due to the ghost image generated by the retroreflector 2 and the decrease in visibility due to the specular reflection image generated by the λ/4 plate 21, the retroreflector 2 is arranged at the position B such that the overall adverse effects can be minimized and the visibility of the air floating video 3 can be improved.

In the second example in FIG. 8B, the direction of the specular reflection light from the λ/4 plate 21 with respect to the incident video light on the optical axis C2 from the beam splitter 101 is illustrated by a double-dot-dashed arrow. In this way, in the optical system in the second example, even if the specular reflection light from the λ/4 plate 21 is generated, the direction of the specular reflection light is obliquely upward in the Y direction as illustrated in the drawing, and the specular reflection light comes out of the range of the floating image 3 and is not directed to the viewpoint of the user. Therefore, in the second example, it is possible to prevent the specular reflection light behind the air floating video 3 from being visually recognized by the user, and the quality of the air floating video 3 can be enhanced.

The arrangement of the retroreflector 2 is not limited to those of the first example and the second example, and the incident angle θ with respect to the incident video light from the beam splitter 101 can be selected from the angle range of about 0 degrees to 10 degrees. The adverse effects due to the specular reflection image by the λ/4 plate 21 can be reduced in the configuration in the second example in which θ is 10 degrees, as compared with the configuration in which θ is 5 degrees.

Furthermore, it is generally well known that the specular reflection can be prevented or reduced by applying a so-called AR coating (Anti-Reflection Coating) to a member that causes the specular reflection. However, when applying the AR coating to the surface of the λ/4 plate 21 in the configuration of the first example in FIG. 8A, although the specular reflection can be prevented, the video light diverges on the λ/4 plate 21 on the contrary, with the result that the air floating video 3 may become blurred and the image quality may be lowered. In particular, the blur is more likely to occur as the size of the display surface of the liquid crystal display panel 12 serving as the video source becomes smaller. Therefore, in the configurations of the first and second examples described above, the AR coating is not applied to the λ/4 plate 21. Moreover, in the configuration of the second example in particular, by devising the arrangement of the retroreflector 2 including the λ/4 plate 21 so as to have the incident angle θ of 10 degrees (θ=10 degrees) as described above, the overall quality of the air floating video 3 can be enhanced.

In addition, as described above, in the second example in FIG. 8B, the angle v is set to 10 degrees such that the directions of the optical axes C2 and C3 of the air floating video 3 become slightly obliquely downward so as to match the preferred line-of-sight direction (direction E) of the user, the retroreflector 2 is arranged at the position B in consideration of the functions of the retroreflector 2 and the λ/4 plate 21 (incident angle θ=10 degrees and φ=80 degrees), and the inclined arrangement angle of the beam splitter 101 is also designed correspondingly (α=40 degrees and β=50 degrees).

As a result of the above, according to the second example, it is possible to obtain a high-quality and suitable air floating video 3 with almost no ghost images and almost no influence of specular reflection by the λ/4 plate 21 in practical terms.

[Installation Example of Air Floating Video Display Apparatus in Vehicle]

FIG. 9 illustrates an installation example (referred to as first installation example) of the in-vehicle air floating video display apparatus described above. FIG. 9 illustrates an example in which the air floating video display 400 is arranged on a right side of a rearview mirror (in other words, driver's mirror) 2102 as viewed from a driver at a right steering wheel position and the air floating video 3 by the air floating video display 400 is formed and displayed at that position. In this first installation example, the housing 106 in which the video display apparatus 1 is stored is fixed to a ceiling portion 2103 in a vehicle.

On the other hands, the housing 107 in which the video controller 300 is stored is arranged at, for example, a left corner position on a dashboard 2100 where the housing 107 does not disturb (is less noticeable for) the driver at the right steering wheel position. Also, the cable 105 connecting the video display apparatus 1 stored in the housing 106 and the video controller 300 stored in the housing 107 can be laid through an inside of an A pillar 2105 and an inside of the ceiling portion 2103 of the vehicle as indicated by a broken line in FIG. 9. In this way, the cable 105 can be laid while keeping the cable 105 from being noticeable.

FIG. 10 illustrates another installation example (referred to as second installation example) of the in-vehicle air floating video display apparatus. FIG. 10 illustrates an example in which the air floating video 3 is displayed by the air floating video display 400 arranged on a right side of the rearview mirror 2102 as viewed from a driver at a right steering wheel position as in FIG. 9. In this second installation example, the housing 107 in which the video controller 300 is stored is stored inside an attachment cover 2107 configured to attach the rearview mirror 2102 on the ceiling portion 2103 in the vehicle instead of being arranged on the dashboard 2100. According to the second installation example, a wiring 2108 of the cable 105 between the housing 106 and the housing 107 can be shortened. Furthermore, since the housing 107 is not installed on the dashboard 2100, an appearance on the dashboard 2100 is clear.

[Modification: Support Column]

Figure 11:
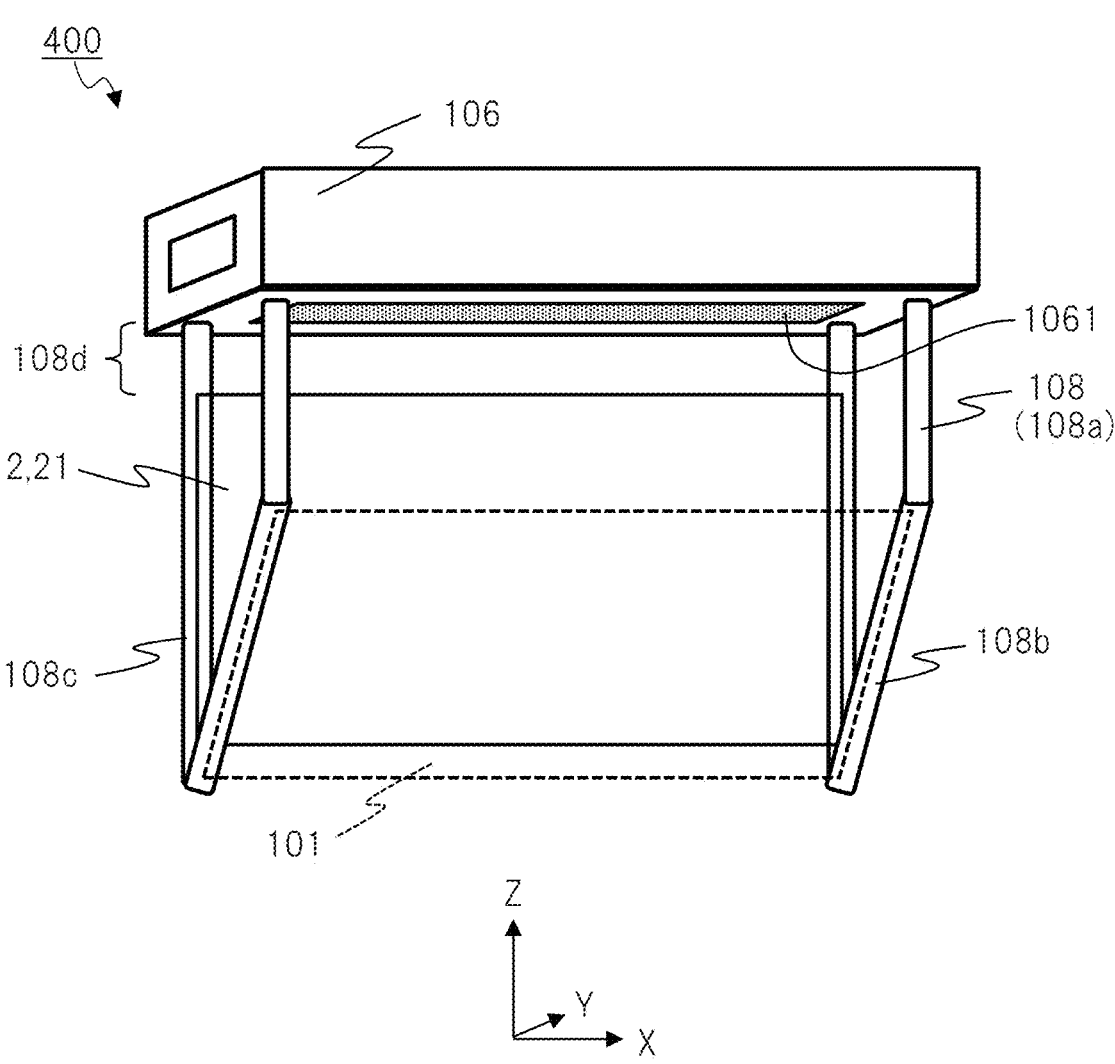
FIG. 11 is a diagram illustrating a configuration example related to a support column in the air floating video display apparatus according to the example of the present invention.

FIG. 11 illustrates a modification of the configuration of the support column 108 of the air floating video display 400. FIG. 11 illustrates a schematic configuration diagram of the air floating video display 400 viewed from the front side (Y direction) of the apparatus. This modification differs from the configuration example of the support column 108 in FIG. 7 in that the lower surface of the housing 106 and the retroreflector 2 and the support column 108 (108c) that supports edges of the retroreflector 2 are also connected by the support column 108 (in particular, support column 108d). In FIG. 11, the retroreflector 2 and the λ/4 plate 21 are simply illustrated by a solid line rectangle, and the beam splitter 101 is simply illustrated by a broken line rectangle.

The support column 108 includes the support column 108d as a constituent part in addition to the support columns 108a, 108b, and 108c described above. The support column 108d is an extension of the support column 108c, and is a portion extending upward in the Z direction from each upper end (left and right) of the support column 108c that supports the edges of the retroreflector 2 to the left and right corners of the lower surface of the housing 106 on the rear side in the Y direction. The support column 108c and the support column 108d may be regarded as one support column.

The various configurations are possible other than the configuration example of the support column 108 described above. The configuration example in which the support column 108a on the front side is eliminated is also possible. Further, for example, the configuration in which the upper and lower sides of the beam splitter 101 and the upper and lower sides of the retroreflector 2 and the like are supported by the support column 108 is also possible.

Effects and the Like

As described above, according to the examples and the modifications, it is possible to provide an air floating video display apparatus that is suitable for use in a vehicle and can display an air floating video with high visibility. The air floating video display apparatus according to the examples in FIG. 7 to FIG. 8B can be readily installed in vehicles as illustrated in FIG. 9 and FIG. 10.

In the examples, the air floating video display apparatus is divided into the two housings (housings 107 and 106) and the air floating video display 400 is made compact and lightweight in consideration of arranging the air floating video display apparatus near the ceiling portion 2103 or the rearview mirror 2102 in the vehicle as in FIG. 9 and the like. Furthermore, in order to enhance the sense of floating in the air, in other words, emphasize the air floating video 3 when the air floating video 3 by the air floating video display 400 is visually recognized by the user, the housing 106 is made thin by providing the housing 106 in which the video display apparatus 1 is stored separately from the beam splitter 101 and the retroreflector 2 that are exposed without being covered with the housing or the like.

Specifically, the beam splitter 101, the retroreflector 2, and the like are arranged on the lower side of the housing 106 so as to be suspended via the support column 108. Among the components, the video display apparatus 1 is the heaviest, and the splitter 101, the retroreflector 2, and the like are beam relatively light. Therefore, the configuration in which the housing 106 in which the video display apparatus 1 is stored is arranged on the top in the vertical direction and is suspended from the ceiling portion 2103 is adopted. Furthermore, the support column 108 and the like are configured so as to be less noticeable as possible, as viewed from the user.

When the user uses the in-vehicle air floating video display apparatus according to the examples, for example, a video of a concierge may be displayed as the air floating video 3, and the concierge can give route guidance, POI information, and the like to the driver. In this way, it is possible to provide visually stimulating, more safe and comfortable driving assistance.

In the technique according to the present example, by displaying video information as a high-resolution and high-brightness air floating video in the air floating state, for example, the user can operate without feeling anxious about contact infection of infectious diseases. If the technique according to the present example is applied to a system used by an unspecified number of users, it will be possible to provide a non-contact user interface that can reduce the risk of contact infection of infectious diseases and can eliminate the feeling of anxiety. In this way, it is possible to contribute to "Goal 3: Ensure healthy lives and promote well-being for all at all ages" in the Sustainable Development Goals (SDGs) advocated by the United Nations.

In addition, in the technique according to the present example, only normal reflected light is efficiently reflected with respect to the retroreflector by making the divergence angle of the emitted video light small and aligning the light with a specific polarized wave, and thus a bright and clear air floating video can be obtained with high light utilization efficiency. With the technique according to the present it is possible to provide a highly usable non-contact user interface capable of significantly reducing power consumption. In this way, it is possible to contribute to "Goal 9: Build resilient infrastructure, promote inclusive and sustainable industrialization and foster innovation" in the Sustainable Development Goals (SDGs) advocated by the United Nations.

In the foregoing, the present invention has been specifically described on the basis of the embodiment, but the present invention is not limited to the embodiment described above, and various modifications can be made within the range not departing from the gist thereof. Each component may be singular or plural unless particularly limited. The components of the respective examples can be added, deleted, replaced, or the like, except for essential components.

REFERENCE SIGNS LIST 1 video display apparatus
2 retroreflector
3 air floating video
11 liquid crystal display panel
12 absorption-type polarization plate
13 light source apparatus
21 λ/4 plate
101 beam splitter (polarization separation member)
105 cable
106 housing (second housing)
107 housing (first housing)
108 support column
300 video controller
400 air floating video display

The invention claimed is:

1. An air floating video display apparatus configured to display an air floating video, the air floating video display apparatus comprising:
a first housing configured to store a video controller;
a second housing connected by wire or wirelessly to the first housing, attachable at a position near a ceiling or a rearview mirror in a vehicle, and configured to store a video display apparatus;
a polarization separation member arranged outside the second housing obliquely at a predetermined angle with respect to the video display apparatus; and
a retroreflector arranged outside the second housing obliquely at a predetermined angle with respect to the polarization separation member display apparatus and having a λ/4 plate provided on a retroreflection surface,

wherein the video display apparatus includes a light source apparatus and a liquid crystal display panel as a video source,
wherein a video light of a specific polarized wave emitted from the liquid crystal display panel is reflected by the polarization separation member, enters the retroreflector to be retroreflected, and passes through the λ/4 plate to be subjected to polarization conversion into a video light of the other polarized wave, the video light of the other polarized wave passes through the polarization separation member, and an air floating video that is a real image is displayed at a predetermined position based on the transmitted video light, and
wherein the polarization separation member and the retroreflector are supported by a support column with respect to the second housing and the support column is made of a transparent member.

2. The air floating video display apparatus according to claim 1,
wherein the retroreflector is arranged such that an incident angle of the video light from the polarization separation member is an angle selected from a range of 0 degrees to 10 degrees.

3. The air floating video display apparatus according to claim 2,
wherein the retroreflector is arranged such that the incident angle of the video light from the polarization separation member is 0 degrees.

4. The air floating video display apparatus according to claim 2,
wherein the retroreflector is arranged perpendicularly to the video display apparatus such that the incident angle of the video light from the polarization separation member is 10 degrees.

5. The air floating video display apparatus according to claim 1,
wherein the polarization separation member and the retroreflector are suspended downward from the second housing.

6. The air floating video display apparatus according to claim 1,
wherein a surface of the support column has a light shielding property for preventing reflection of an external light.

7. The air floating video display apparatus according to claim 1,
wherein the polarization separation member is made of a reflection-type polarization plate or a metal multilayer film that reflects the specific polarized wave.

8. The air floating video display apparatus according to claim 1,
wherein the video display apparatus includes an absorption-type polarization plate provided on a video light emission side of the liquid crystal display panel, or an antireflection film is provided on a video display surface of the liquid crystal display panel.

* * * * *